(12) United States Patent
Calle et al.

(10) Patent No.: US 10,897,855 B2
(45) Date of Patent: Jan. 26, 2021

(54) PALLETIZED KIT FOR A REINFORCED EARTH WALL STRUCTURE

(71) Applicants: Jon Calle, Pottstown, PA (US); Sean O'Donnell, Glenmoore, PA (US)

(72) Inventors: Jon Calle, Pottstown, PA (US); Sean O'Donnell, Glenmoore, PA (US)

(73) Assignee: Grostructures LLC, Pottsdown, PA (US)

( * ) Notice: Subject to any disclaimer, the term of this patent is extended or adjusted under 35 U.S.C. 154(b) by 0 days.

(21) Appl. No.: 16/162,204

(22) Filed: Oct. 16, 2018

(65) Prior Publication Data

US 2019/0150373 A1    May 23, 2019

Related U.S. Application Data

(63) Continuation-in-part of application No. 15/954,992, filed on Apr. 17, 2018.

(60) Provisional application No. 62/486,187, filed on Apr. 17, 2017.

(51) Int. Cl.
*A01G 9/02* (2018.01)
*A01G 25/02* (2006.01)
*E02D 29/02* (2006.01)

(52) U.S. Cl.
CPC ........... *A01G 9/025* (2013.01); *A01G 25/023* (2013.01); *E02D 29/0283* (2013.01); *E02D 2200/13* (2013.01); *E02D 2250/003* (2013.01); *E02D 2250/0007* (2013.01); *E02D 2300/0006* (2013.01); *E02D 2300/0026* (2013.01); *E02D 2300/0075* (2013.01)

(58) Field of Classification Search
CPC .. A01G 9/025; A01G 25/023; E02D 29/0283; E02D 29/00; E02D 29/02; E02D 17/20
USPC ................................ 405/262, 272, 276, 284
See application file for complete search history.

(56) References Cited

U.S. PATENT DOCUMENTS

| | | |
|---|---|---|
| 4,329,089 A | 5/1982 | Hilfiker |
| D290,179 S | 6/1987 | Peltola |
| D315,757 S | 3/1991 | Klitsner |
| 5,064,090 A | 11/1991 | Farrier |
| D326,552 S | 5/1992 | Goodell |
| D327,560 S | 6/1992 | Hradisky |
| D348,128 S | 6/1994 | Craft et al. |
| D350,423 S | 9/1994 | Craft, Jr. et al. |
| 5,417,338 A | 5/1995 | Roy et al. |
| D359,850 S | 7/1995 | Staubitz et al. |
| D360,116 S | 7/1995 | Fillipp |
| 5,445,397 A | 8/1995 | Evans |

(Continued)

FOREIGN PATENT DOCUMENTS

| | | |
|---|---|---|
| DE | 102010024555 A1 | 12/2011 |
| EP | 2399449 A2 | 12/2011 |

(Continued)

*Primary Examiner* — Sean D Andrish
(74) *Attorney, Agent, or Firm* — BakerHostetler

(57) ABSTRACT

A pocket structure for receiving containerized plants is sloped and hung from a wire of a wire basket. The pocket structure includes hooks, an irrigation fitting and corresponding drip channel to transmit water toward the rear of the pocket, and slots in the walls. The mesh units include braces and are sized for shipping. An earth wall is formed of the mesh units and pockets, and includes irrigation tubing. The components may be formed into a palletized kit.

24 Claims, 21 Drawing Sheets

(56) References Cited

U.S. PATENT DOCUMENTS

| | | | |
|---|---|---|---|
| D370,701 S | 6/1996 | Thomsen | |
| 5,647,695 A | 7/1997 | Hilfiker et al. | |
| 5,683,744 A | 11/1997 | Jolly et al. | |
| 5,878,908 A | 3/1999 | Foley | |
| 5,947,643 A | 9/1999 | Anderson et al. | |
| 5,951,209 A * | 9/1999 | Anderson | E02D 29/0225 |
| | | | 405/262 |
| D438,010 S | 2/2001 | Drury et al. | |
| D459,077 S | 6/2002 | Krivulin | |
| D466,013 S | 11/2002 | Nance | |
| D564,758 S | 3/2008 | Drury | |
| D581,670 S | 12/2008 | Neilsen | |
| D602,667 S | 10/2009 | Barbieri | |
| D603,197 S | 11/2009 | Hrovat | |
| D606,313 S | 12/2009 | Neilsen | |
| D681,334 S | 5/2013 | Goodell | |
| 8,479,444 B2 | 7/2013 | Mesiara | |
| 8,683,744 B2 | 4/2014 | Chang | |
| D724,481 S | 3/2015 | Blouin | |
| D730,079 S | 5/2015 | Lee et al. | |
| D820,722 S | 6/2018 | Shaffer et al. | |
| 2007/0251144 A1 | 11/2007 | Cooley | |
| 2010/0095586 A1 | 4/2010 | Sichello | |
| 2010/0146150 A1 | 6/2010 | Bamba | |
| 2010/0325953 A1 | 12/2010 | Chang | |
| 2011/0025704 A1 | 2/2011 | Odland et al. | |
| 2011/0146150 A1 | 6/2011 | Lyon | |
| 2011/0252704 A1 | 10/2011 | Cho | |
| 2011/0311318 A1 * | 12/2011 | Taylor | E02D 29/0225 |
| | | | 405/284 |
| 2012/0272573 A1 | 11/2012 | Hashimoto | |
| 2013/0333286 A1 | 12/2013 | Billingsley | |
| 2014/0100854 A1 | 4/2014 | Chen et al. | |
| 2015/0265792 A1 | 9/2015 | Goudra et al. | |
| 2016/0050856 A1 * | 2/2016 | Shah | A01G 9/025 |
| | | | 47/66.1 |
| 2016/0262316 A1 * | 9/2016 | Woolbright | A01G 9/025 |
| 2018/0295791 A1 | 10/2018 | Calle et al. | |
| 2019/0150373 A1 | 5/2019 | Calle et al. | |

FOREIGN PATENT DOCUMENTS

| | | |
|---|---|---|
| EP | 2692225 A1 | 2/2014 |
| KR | 10-0650638 B1 | 11/2006 |
| WO | 2014100854 A1 | 7/2014 |

* cited by examiner

PALLETIZED KIT FOR A REINFORCED EARTH WALL STRUCTURE

CROSS-REFERENCE TO RELATED APPLICATIONS

This application is a continuation-in-part application of U.S. patent application Ser. No. 15/954,992, filed Apr. 17, 2018, which claims priority to U.S. Provisional Application No. 62/486,187, filed on Apr. 17, 2017, the disclosure of each of which is incorporated herein by reference in their entireties.

BACKGROUND

Creating earth walls can promote efficient land use. For example, in commercial or residential construction, an earth wall can create useable land from a steep slope. In road excavation, an earth wall can be efficient use of land. In landfill construction, an earth wall can increase the useable landfill volume.

For short residential walls under three or four feet high, interlocking blocks alone, such as those sold through home centers, are sufficient in many circumstances. Walls of this type are referred to as gravity walls.

For higher walls or commercial or industrial uses, an earth wall is typically created by installing horizontal sheets of a primary reinforcement fabric that extend from near the front face into the earth for several feet or dozens of feet, depending on the parameters of the site, such as total wall height desired, soil conditions, toe slopes, anticipated surcharges, and the like. And a secondary reinforcement fabric is installed at the front face of the wall in a C-shape (in vertical cross section) to wrap the front face of the earth wall. Primary reinforcement fabric tends to be chosen for its tensile strength. Secondary reinforcement fabric may also require resistance to sunlight and other ambient environmental conditions.

Long wire mesh "baskets" or L-shaped structures are installed such that one leg of the basket is horizontal and in contact or near the primary reinforcement fabric and an adjoining leg of the basket is at the vertical front face of the earth wall. The weight of the fill puts a vertical downward force on the lower leg of the L-shaped unit. Typically, the wire mesh is installed in front of the secondary reinforcement fabric (that is, the fabric is relatively inward toward the earth and the wire mesh is relatively outward toward the ambient).

Typically, the primary reinforcement and secondary reinforcement fabrics and wire mesh are installed together and the earth is compacted to form a layer. Then another layer of primary and secondary reinforcements and wire mesh is installed on top of the first layer, but longitudinally offset or tiered relative to the layer below it. The tiered or step-like structure includes a nearly vertical face and a nearly horizontal step. Some specifications are written to request vegetation on the front face of the wall.

Conventional earth wall structures are commonplace across all construction sectors including commercial, residential, industrial, transportation, educational, energy, among others. Tens of millions of square feet of walls and steepened slopes of all types are used to level grades for new roadways, parking lots, and building pads for various uses. And there are many different types of systems and facing options that make up the "vertical earth" category. A wall formed from baskets of L-shaped units, reinforcement fabric, fill, and (optionally) vegetation is one example of vertical earth structures.

Vegetation provides a "cooling" effect in the environment and manmade materials such as steel, concrete, and pavement can create a "heating" effect. Green roofs have proven to be popular and if plantable, a green wall generally provides a softer, cooler feel and could become equally popular in reducing the carbon footprint of a newly constructed project.

Welded Wire Face Reinforced Soil Slopes (RSS) have become commonplace as a cost effective vertical retaining wall option. Once considered "temporary" by design and heavily used by State and Federal Department of Transportation (DOTs), this system type is often now considered for use as "permanent" structures in both public and private development. A few key elements that allow engineers to design WW RSS structures for permanent use include hot dipped galvanized face baskets and struts, UV stabilized turf reinforcement facing, and then vegetation, such as grass or vine for permanent aesthetic appeal and facial erosion stability.

SUMMARY

According to a first aspect, welded wire facing element of a RSS system provides a reliable and dimensionally accurate framework for permanent vegetation upon application of the pocket structure disclosed herein. A pocket structure for installing in an earth wall includes pocket sidewalls that are adapted for receiving a containerized vegetation; a hook surface adapted for attaching the pocket sidewalls to a reinforced soil structure wire; and a liquid receiver adapted for receiving liquid from an irrigation system. The reinforced soil structure preferably is a wire mesh, but other structures are contemplated, as the pocket structure has uses outside of wire mesh RSS applications.

Preferably, the hook surface is formed on a hook or pair of hooks that are integrally formed with the pocket sidewalls and are adapted to snap onto a wire. The hook surface may also be a separate clip, cable tie, or other mechanism for installing and holding the pocket structure on or against the wire mesh or other structure. The sidewalls may form forward-most edges of the upper and bottom walls to form a front face, which preferably is planar, and is configured to contact the wire mesh when hung or applied to the wire mesh. The liquid is typically water from an irrigation system, and encompasses water having a liquid-soluble fertilizer and/or other additives. The pocket structure may also include a retainer, such as tabs or a pocket, for holding fertilizer, such as a fertilizer tablet.

The pocket sidewalls preferably include a bottom wall and an opposing upper wall that in the installed position preferably have a rearward or downward sloped orientation. Plants that are inserted into the pocket preferably are in a container (preferably a biodegradable container, commonly referred to as a peat pot) and the sloped orientations (especially when a tapered peat pot is installed in the pocket) enable gravity to hold the plant in the pocket structure. In this regard, one or both of the bottom and upper sidewalls may be each sloped. Preferably, the walls include openings suitable for roots to grow through, except where a drip channel is formed. Thus, the terms "sidewall" and "walls" are used broadly to refer to a shell that is suitable for holding a plant or plant container in any way.

The liquid receiver can include a drip channel and a boss for receiving irrigation water and/or a fitting for connecting to the irrigation tube. Preferably, the drip channel is a groove formed in the underside of the upper wall. The term "drip channel" is used broadly herein to refer to a groove, tube, and like structure for transmitting liquid. Preferably, the upper wall when installed slopes rearward (that is, is angled at an acute angle relative to the horizontal) to facilitate rearward irrigation water flow via the drip channel to irrigate the plant within the pocket. Thus, the upper wall preferably is dimensioned relative to the intended plant container dimensions such that the upper surface is spaced apart from the plant container such that the plant container does not interfere with water flow through the drip channel.

The pocket sidewalls can include left and right sidewalls coupled between the bottom wall and the upper wall, and a rear wall coupled to the left and right sidewalls. Thus, the bottom wall, the upper wall, the sidewalls, and the rear wall can define a unitary structure. When intended for use with a tapered plant container, the upper wall and bottom wall may be mutually tapered, and the left sidewall and upper sidewall may be mutually tapered (that is, each surface wall is tapered relative to a longitudinal centerline of the pocket structure). The unitary pocket structure may be formed by one of an injection molded plastic, a metal sheet metal, or a wire fabrication.

The pocket structure can be configured to be installed behind a wire mesh and sized relative to the wire mesh opening such that the pocket structure is retained by the wire mesh. The pocket structure may be sized to be smaller than the opening in the wire mesh, and/or the pocket structure may include peripheral tabs adapted to prevent the pocket structure from passing through openings in the wire mesh.

In another aspect, an earth wall system suitable for growing vegetation on its front face can include a wire mesh having an opening in its front face; a reinforcement fabric having a portion that is vertical and proximate the wire mesh front face; a pocket structure of the type described herein, vegetation that is located in the pocket structure; and irrigation tubing having an outlet proximate the poi outlet of irrigation tubing, and can include a fitting head located above the pocket structure that is connected to the irrigation tube. The reinforcement fabric preferably is a primary and/or secondary reinforcement fabric, preferably in a "face wrap" configuration, as will be understood by persons familiar with RSS or earth wall technology.

As explained above, the pocket structure can be tapered and installed on the backside of the wire mesh, and held to the wire mesh by one or more hooks such that a front face of the pocket contacts the backside of the wire mesh. A lower wall of the pocket structure can be angled rearward such that gravity aids in holding the peat pot in the pocket. The upper wall of the pocket structure is angled rearward such that gravity aids in moving water rearward (via surface tension). The system can include irrigation tubing runs along the wire mesh to a drip fitting that is located above or in the boss receiver of the pocket structure such that water from the fitting flows into the drip channel via the receiver. The vegetation can be in a peat pot or like container located in the pocket.

The pocket structure can be tapered at approximately the same angle as the angle of corresponding peat pot size, and the pocket is sized such that the upper wall of the peat pot (when installed) is spaced apart from the drip channel by between 0.125 inches and 0.75 inches. A fertilizer tablet (or other fertilizer component) can be retained in the pocket, preferably located at the rear of the pocket and located relative to a drip channel (described above) such that water from the drip channel contacts the fertilizer to feed the vegetation.

The earth wall system can be packaged for shipping. Thus, another aspect of the present invention is an earth wall system kit comprising L-shaped wire mesh units, irrigation tubing, pocket structures described above, and drip fittings that are packaged together on a pallet. In this regard, the wire mesh units can be between 24 inches long so as to fit onto a 4×4 pallet. At least some of the mesh units in the package are oriented vertically, such that the wire mesh units can support the weight of another pallet of pre-packaged wire mesh units, irrigation tubing, pocket structures described above, and drip fittings. Preferably, the wire mesh units are 12 inches high.

A method of forming an earth wall includes the steps of: installing a wire mesh (such as an L-shape unit or basket) on an earth surface; installing a pocket structure described above on one of the wires of the wire mesh (preferably an upper one of the horizontally oriented wires and preferably via hooks on the pocket structure) by engagement of the hook surface with the wire mesh, preferably such that the pocket structure is on the backside of the wire mesh; installing primary and/or secondary reinforcement fabric and installing earth fill on or in the fabrics; installing vegetation (such as a grass or vine, preferably in a peat pot) into the pockets of the pocket structures; and installing irrigation tubing having a drip head aligned with the pocket structure.

The step of installing the wire mesh units is repeated to form a longitudinal wall of wire mesh units, and pocket structures are installed at predetermined intervals along the longitudinal wall. The irrigation tubing is also installing longitudinally and affixed to the pockets via the fitting in the boss, attached to the wire mesh, or both.

According to another aspect of the reinforced earth wall system, a kit for the components of an earth wall system are provided, such as on a pallet. The kit includes L-shaped earth wall baskets vertically oriented on a pallet and pocket structures adapted for installing in an earth wall. Each pocket structure includes pocket sidewalls that are adapted for receiving a containerized vegetation; a hook surface adapted for attaching the pocket sidewalls to a reinforced soil structure wire; and a liquid receiver adapted for receiving liquid from an irrigation system.

The kit the pallet can include nested groups of L-shaped earth wall baskets proximate a center of a pallet, the groups being oriented vertically such that (i) vertices of the groups are adjoining; (ii) an outboard one of each one of the nested groups forms a vertical, right angle recess; and (iii) outboard portions of adjacent nested groups form V-shaped recesses therebetween; vertically oriented first rolls of reinforcement fabric located in the right angle recesses on the pallet; vertically oriented second rolls of reinforcement fabric located in the V-shaped recesses on the pallet; at least one of the groups of baskets, the first rolls, and the second rolls packed on the pallet forming a base structure capable of supporting a vertical load from another palletized kit for a reinforced earth wall system; plural pocket structures adapted for mounting to the baskets and for receiving vegetation, the pocket structures being located in a central bay formed between at least some of the first rolls and the second rolls of reinforcement fabric; and irrigation tubing being located in the central bay. The baskets, first and second rolls of reinforcement fabric, the pocket structures, and the irrigation tubing are adapted for installation together with earth fill after unpacking from the pallet to form a reinforced earth wall system.

Preferably the first rolls of reinforcement fabric are primary reinforcement fabric and the second rolls of reinforcement fabric are secondary reinforcement fabric. Each roll of fabric can be cut to have a height of approximately 36 inches such that the rolls are taller than the vertical dimension of the groups of baskets. Thus, the rolls can structurally support the vertical load of like palletized kit without additional or external reinforcing structure. Preferably, the baskets are right angle baskets that are oriented such that the vertices are adjacent in the center of the pallet. The rolls are then located in the right angle and v-shaped recesses. In this regard, four rolls of primary reinforcement fabric and four rolls of secondary reinforcement fabric are located, respectively in the right angle recesses and the v-shaped recesses. Any configuration is contemplated and may be chosen according to the roll diameters and relative sizes of the right angle recesses and the v-shaped recesses.

A cargo bay is formed on top of the baskets and generally within the rolls, which bay receives and holds a roll of irrigation tubing, the pocket structures, and drip emitters and irrigation fittings (such as elbows, junctions, and the like) as needed. The pallet thus may be a cube having approximately sides of four feet. The term cube as used herein is intended in the geometric sense, but as used in the industry, and thus the dimension may vary, especially the height. Thus, a four foot cube may have a height significantly less than four feet, as it fits within a four foot tall space.

The four foot cube preferably include the pallet itself, four groups of 25 baskets (for a total of 100 baskets), between 50 and 100 square yards of each one of a primary reinforcement fabric and a secondary reinforcement fabric, 100 feet of irrigation tubing and corresponding irrigation fittings, and 100 drip emitters. As each basket is 12 inches tall and 24 inches long (that is, the face is 24 inches plus two inches of protruding wires on each end that overlaps with the adjacent 24 inch face), each pallet includes the necessary components for 200 square feet of reinforced earth wall system, described herein. In this regard, in most circumstances, the local soil removed during the installation process may be used with the reinforcement fabric, making the palletized kit significantly less costly to transport than competing systems, such as block walls.

In this regard, the kit is capable of being removed from a truck, lowered, and transported on over ground by a hand-operated (that is, not powered by a motor or other external means) pallet jack. The mesh basket can include horizontal and vertical components. The vertical components include first components and second components that are stronger than the first components. Preferably, the mesh basket is formed by wires connected together at their interfaces, and the second components are thicker than the second components. The thickness of the second wires can be chosen to reinforce the basket structure from undue deformation (that is, significantly past 90 degrees between the face and the let) after the earth wall is installed (as described herein). Optionally, the increased bending strength or resistance to deformation of the basket may enable omission of the brackets during installation. The basket having thicker wire components may otherwise function and be palletized as described herein. Thus, each pallet or groups of pallets can pre-package the materials for forming an earth wall, including mesh units 80, pockets 10, and irrigation tubing 60.

DESCRIPTION OF SOME PREFERRED EMBODIMENTS

Figure 1:
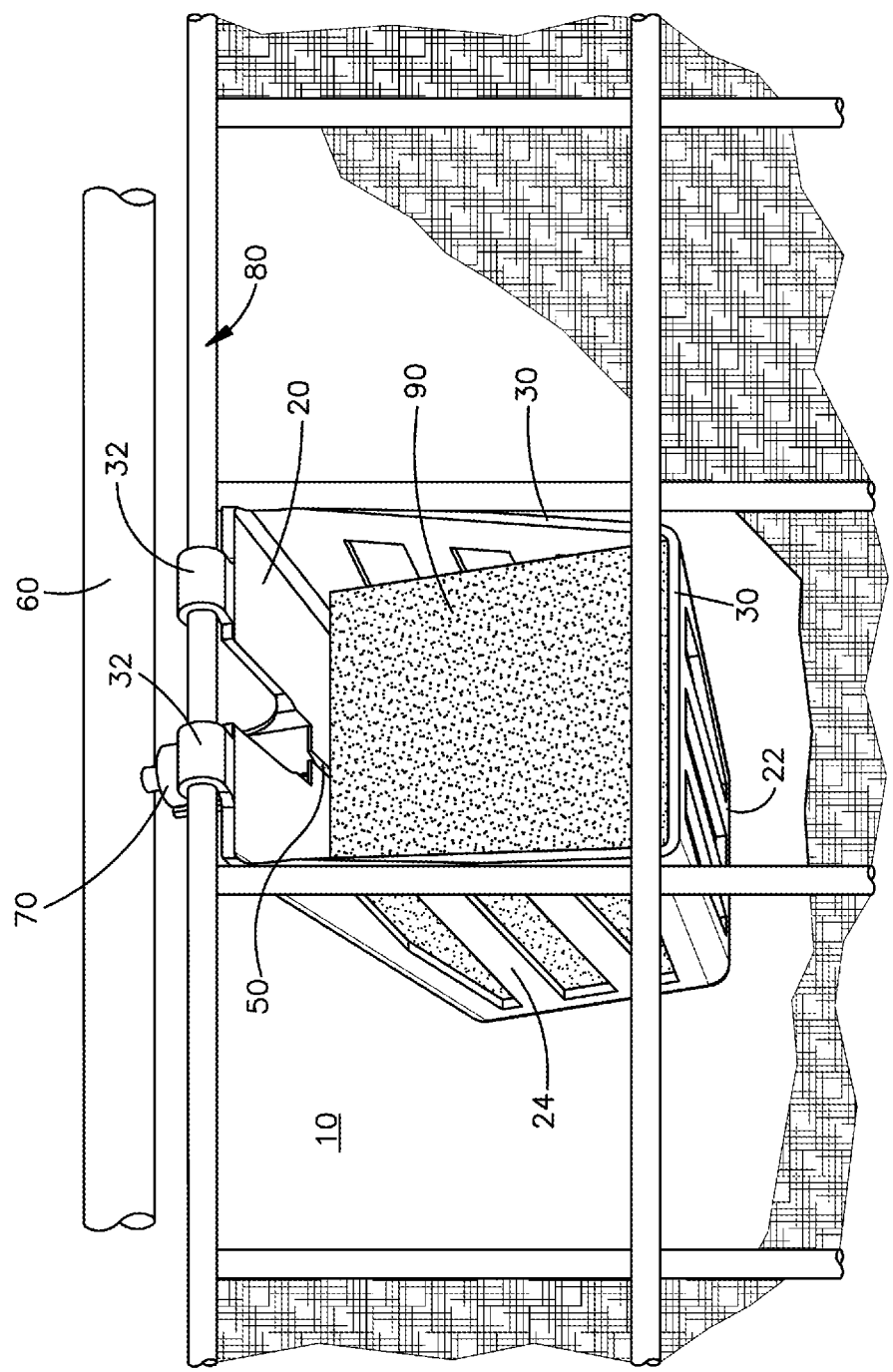
FIG. 1 is a top perspective view of a portion of components of an earth wall structure.
Figure 2:
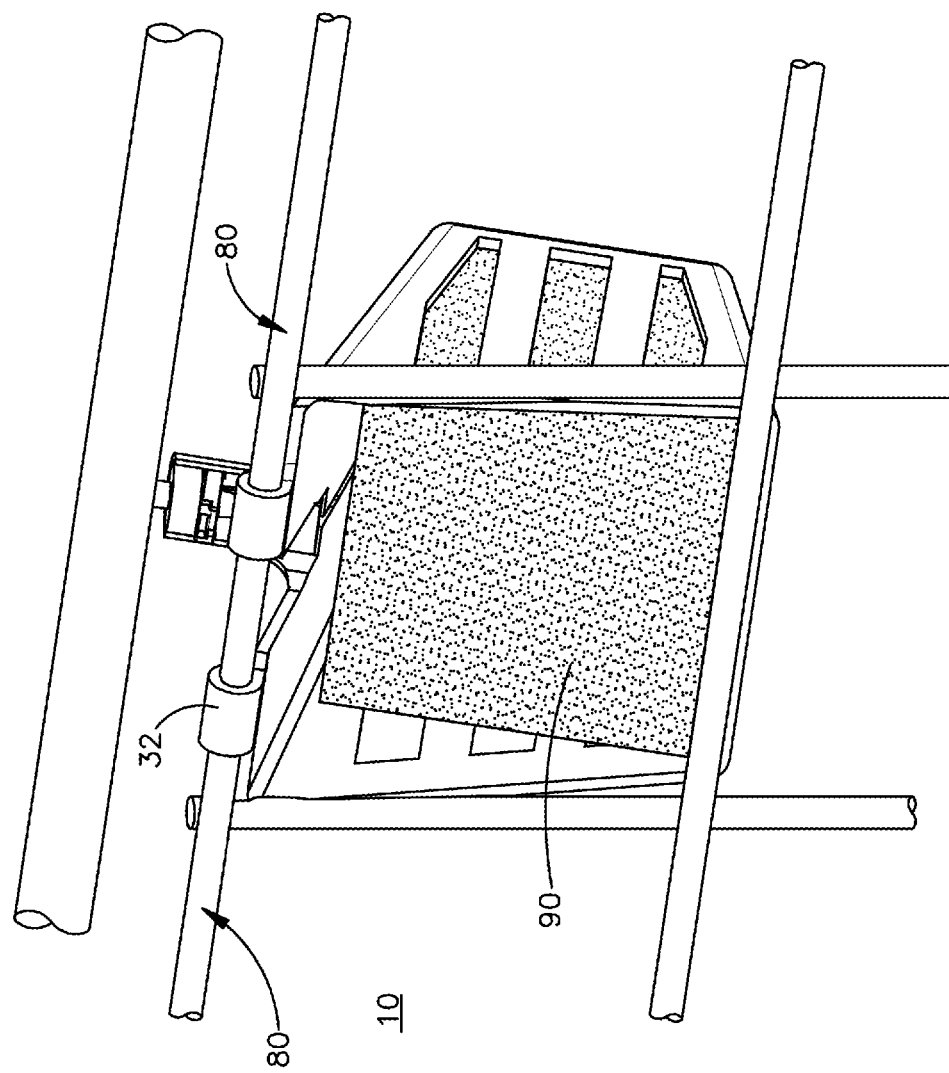
FIG. 2 is another perspective view of the structure of FIG. 1.
Figure 3:
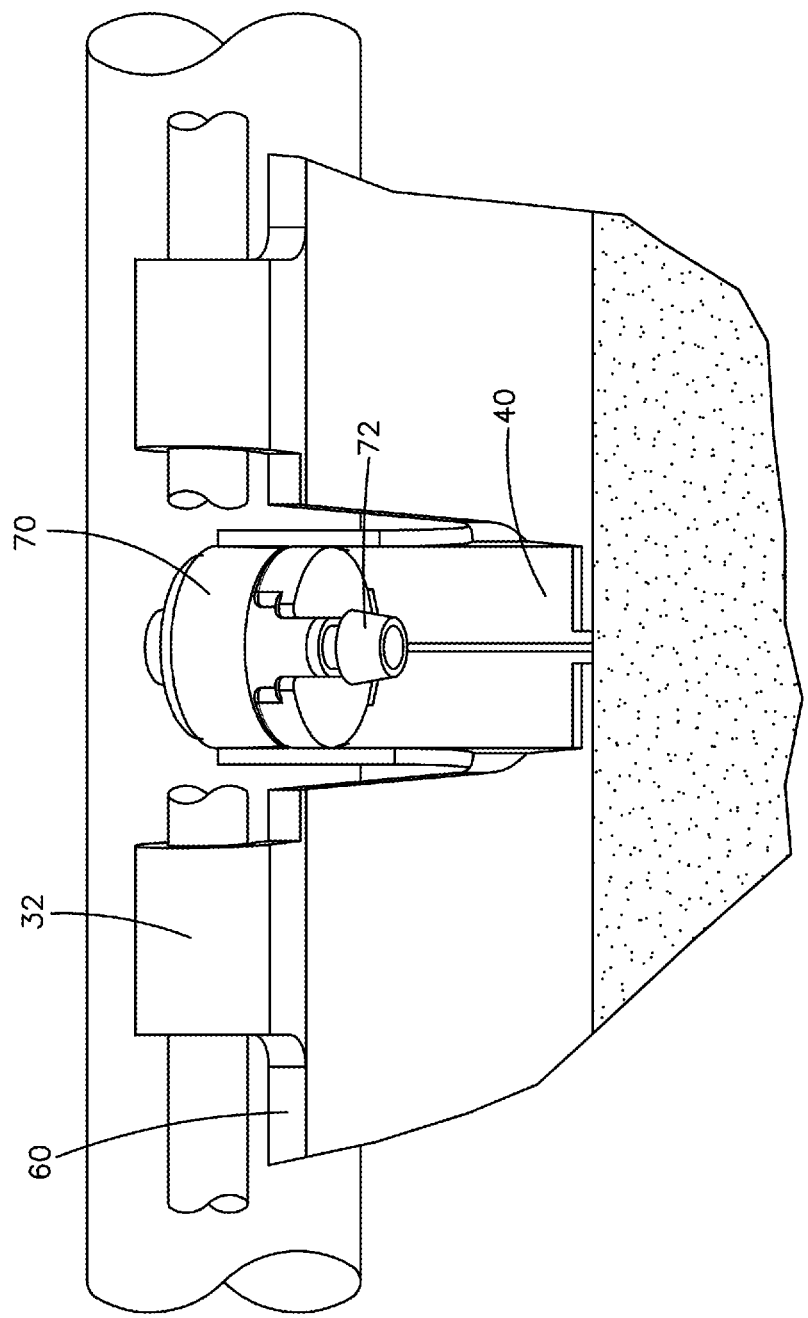
FIG. 3 is an enlarged view of a portion of the structure of FIG. 1.
Figure 4:
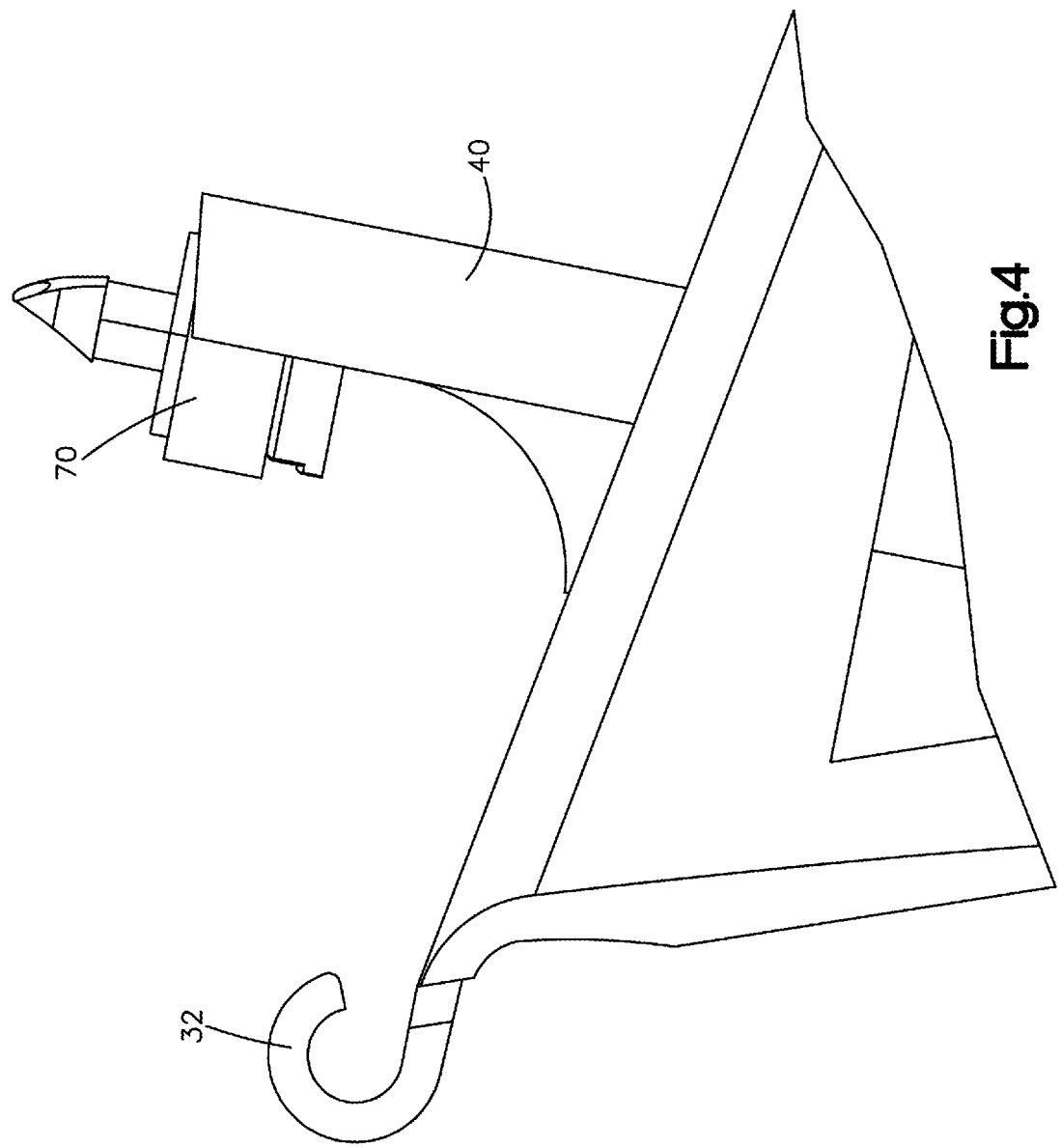
FIG. 4 is a side view of the pocket structure and drip irrigation fitting assembly.
Figure 5:
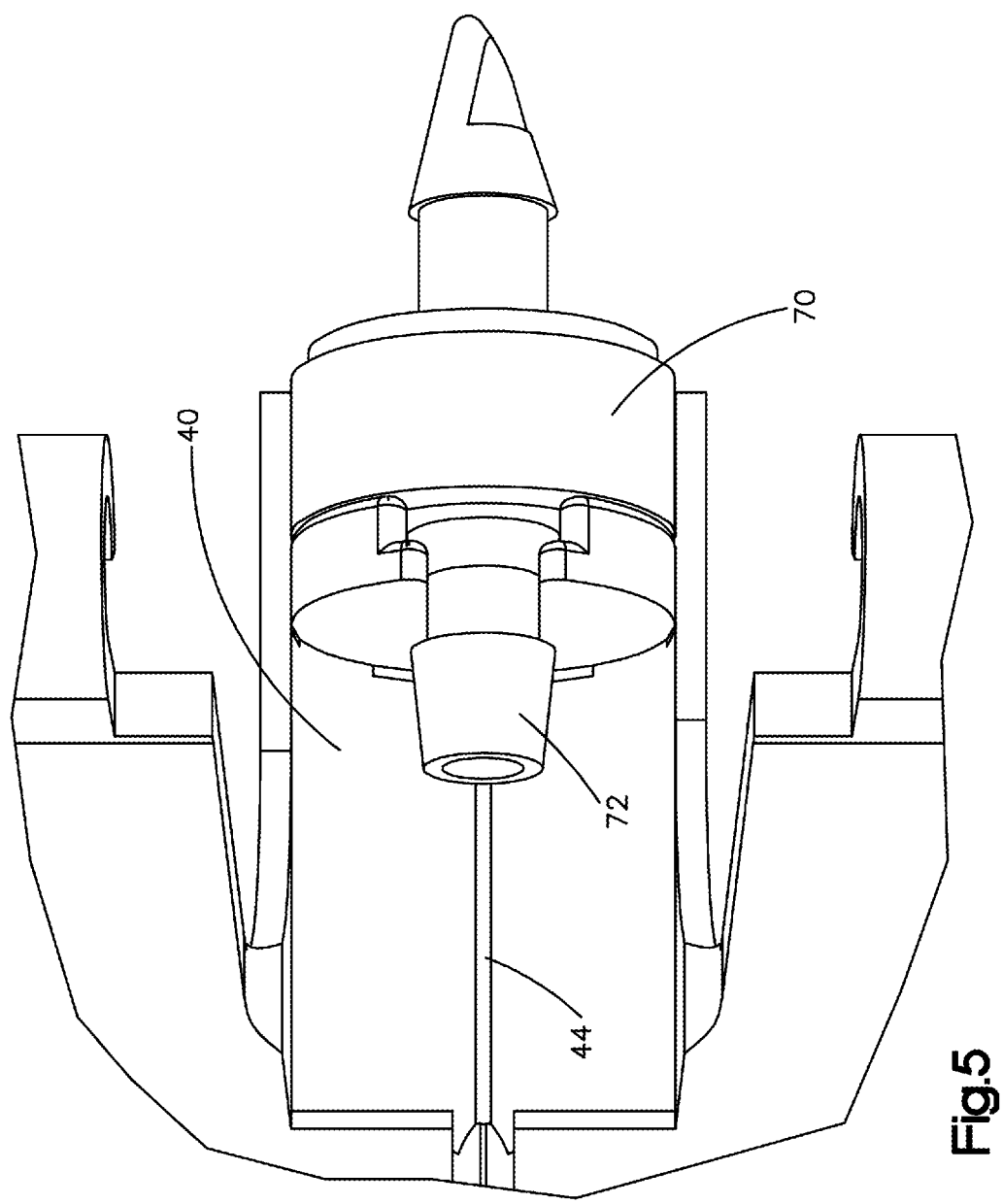
FIG. 5 is an enlarged view of a portion of the assembly of FIG. 4.
Figure 6:
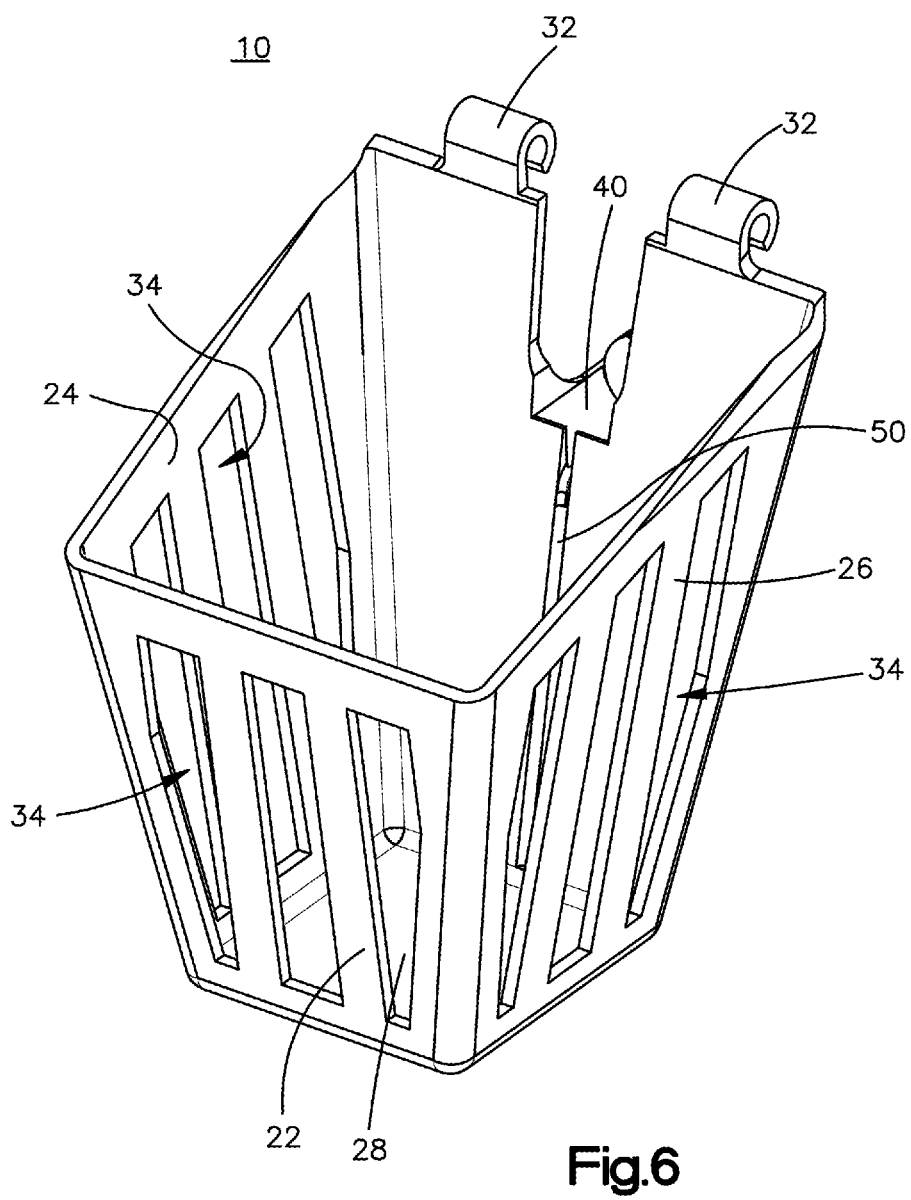
FIG. 6 is a perspective view of the pocket structure.
Figure 8:
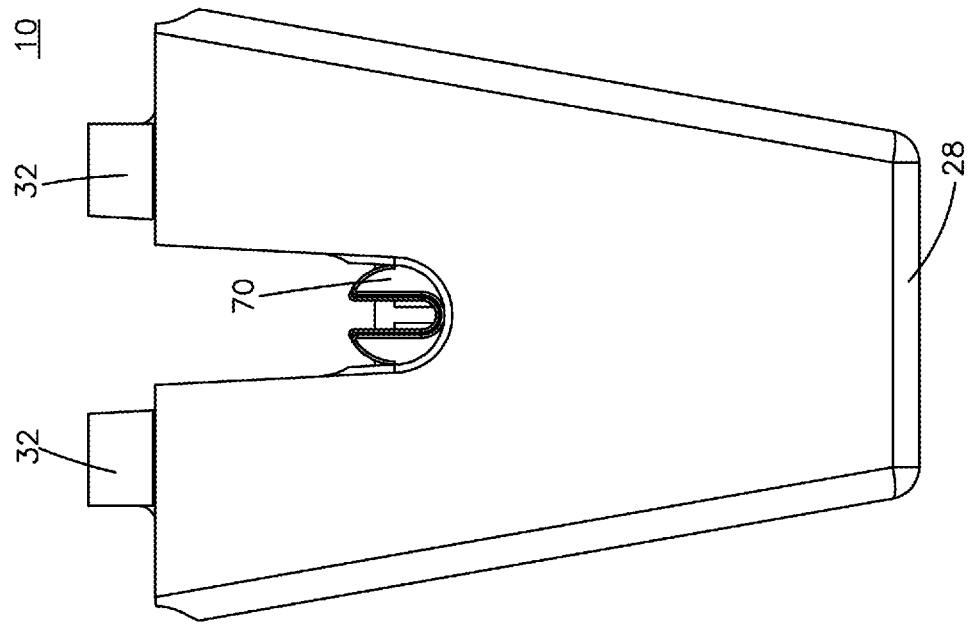
FIG. 8 is a view of the pocket structure of FIGS. 6 and 7.
Figure 7:
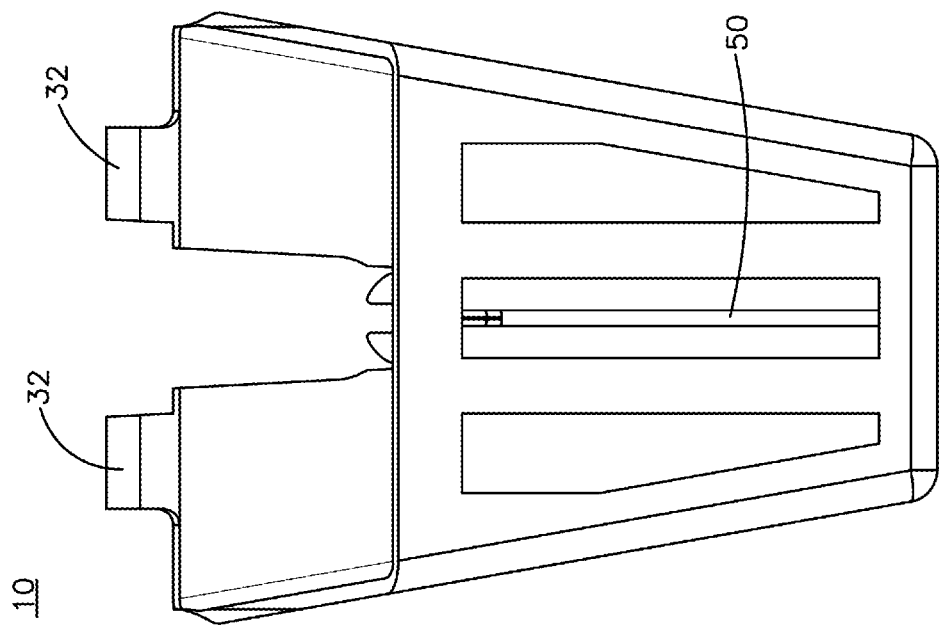
FIG. 7 is another perspective view of the pocket structure.
Figure 9:
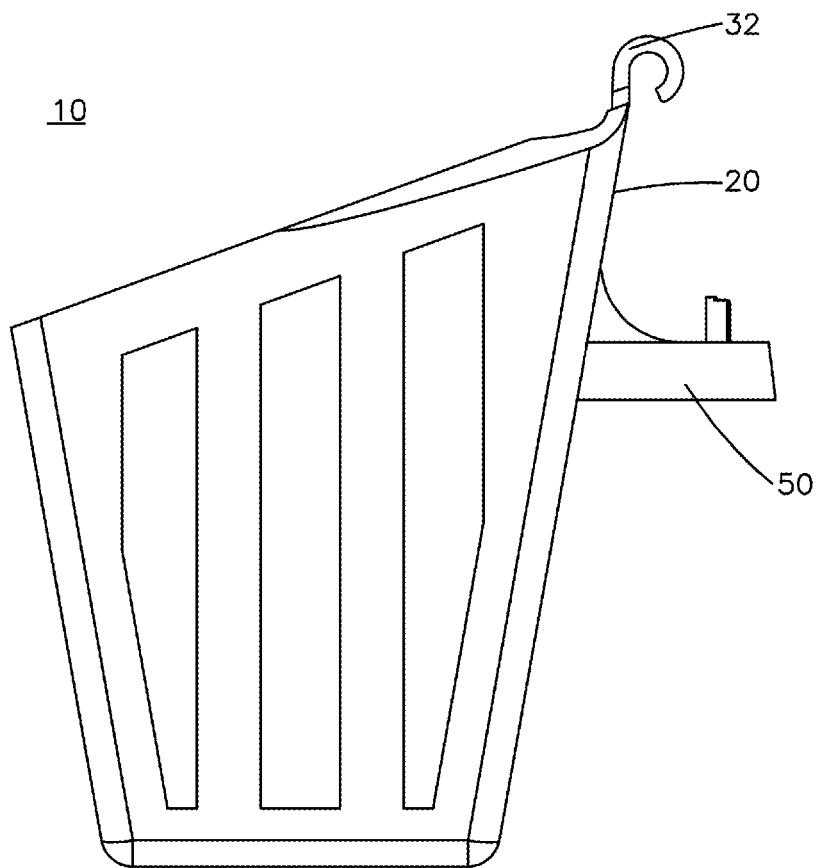
FIG. 9 is a side view of the pocket structure of FIGS. 6 and 7.
Figure 10:
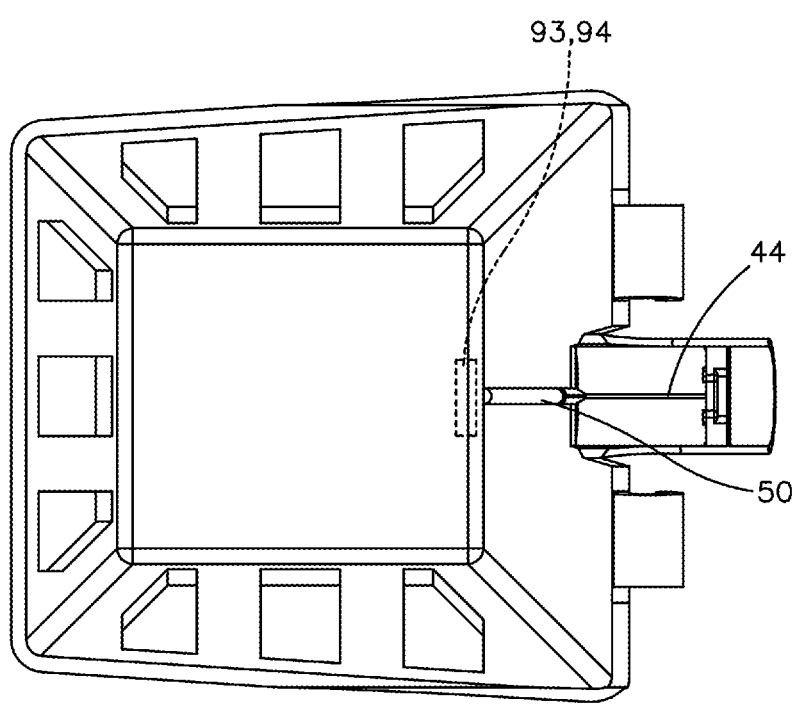
FIG. 10 is a front view of the pocket structure of FIGS. 6 and 7.

Referring to the FIGS. 1 through 10 to describe an embodiment of one aspect of the present invention, a pocket unit or pocket structure 10 is a unitary object that forms an enclosed, tapered, open-topped enclosure for holding plants, especially a container 90 having a plant. Pocket structure 10 includes four sidewalls: an upper wall 20, a lower wall 22, and left and right sidewalls 24 and 26. Upper wall 20 and lower wall 22 are named according to their orientation while installed in a wire mesh or like structure, and the orientations of "upper" and "lower" are merely for convenience of description.

The term "earth wall" is herein as generally used in the commercial landscaping industry, and is used broadly to refer to walls, slopes, and like structures.

Figure 11:
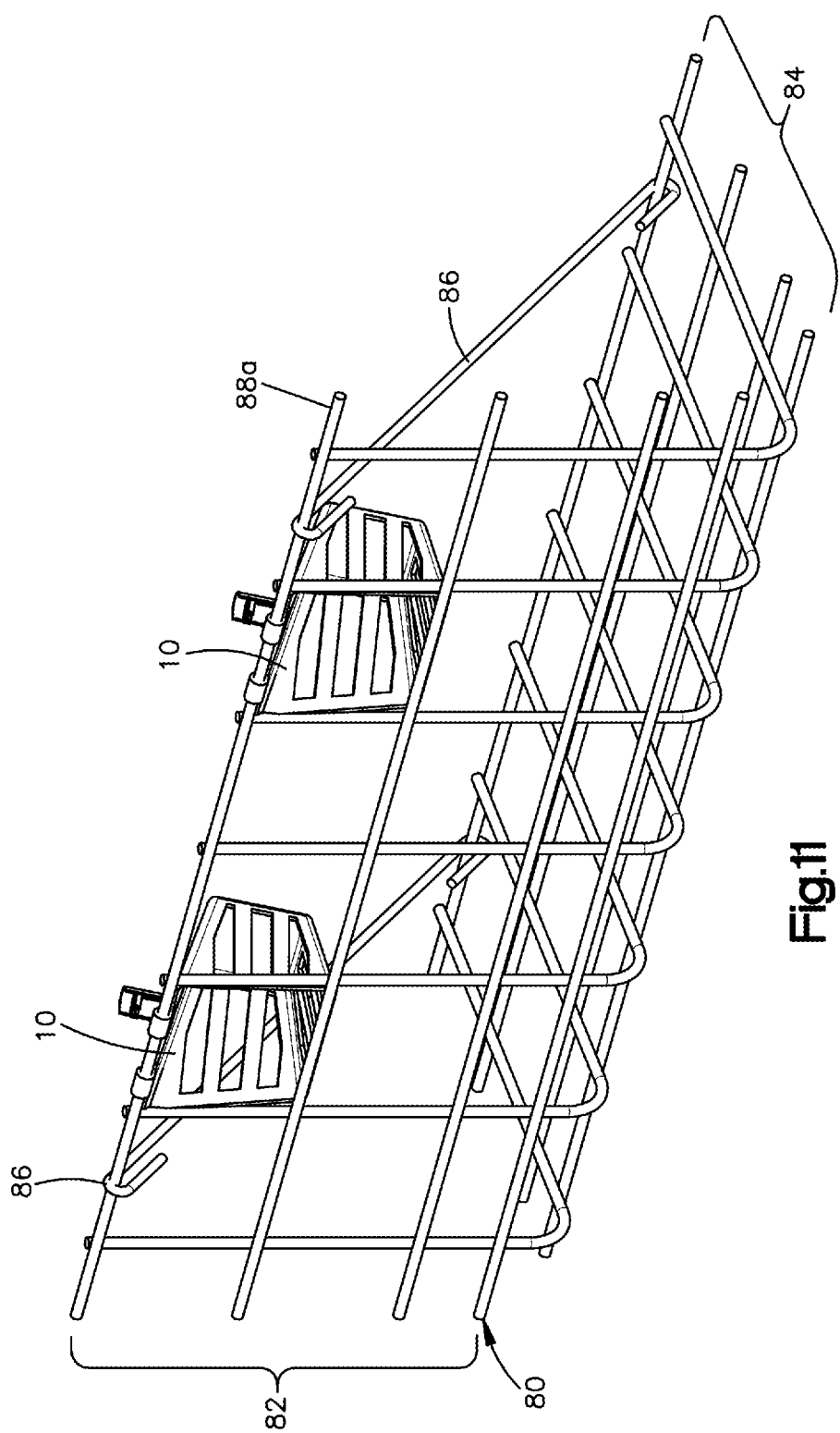
FIG. 11 is a top, front perspective view of a pocket structure mounted on a wire mesh basket.
Figure 12:
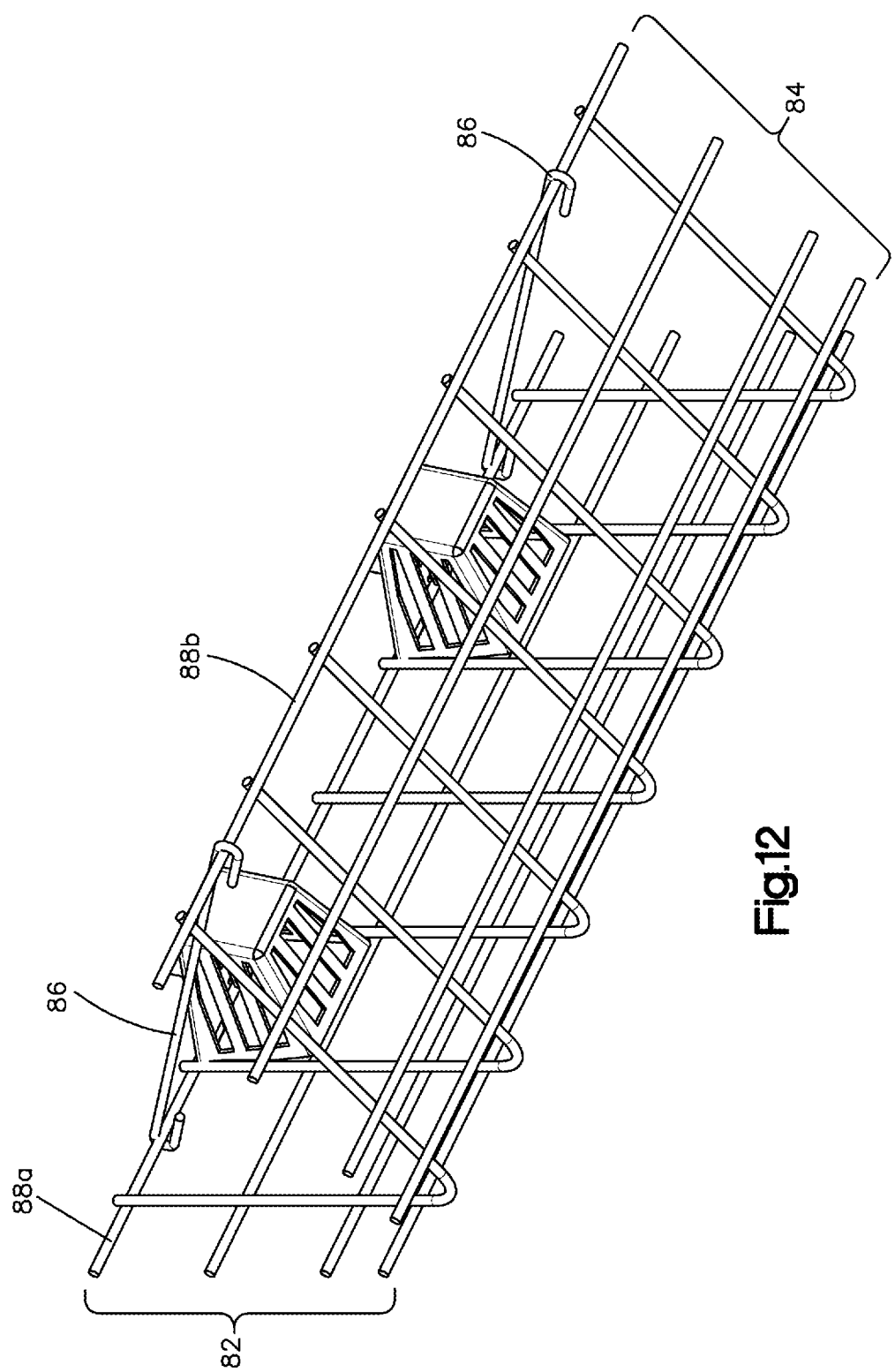
FIG. 12 is a bottom, rear perspective view of the structure of FIG. 11.
Figure 13:
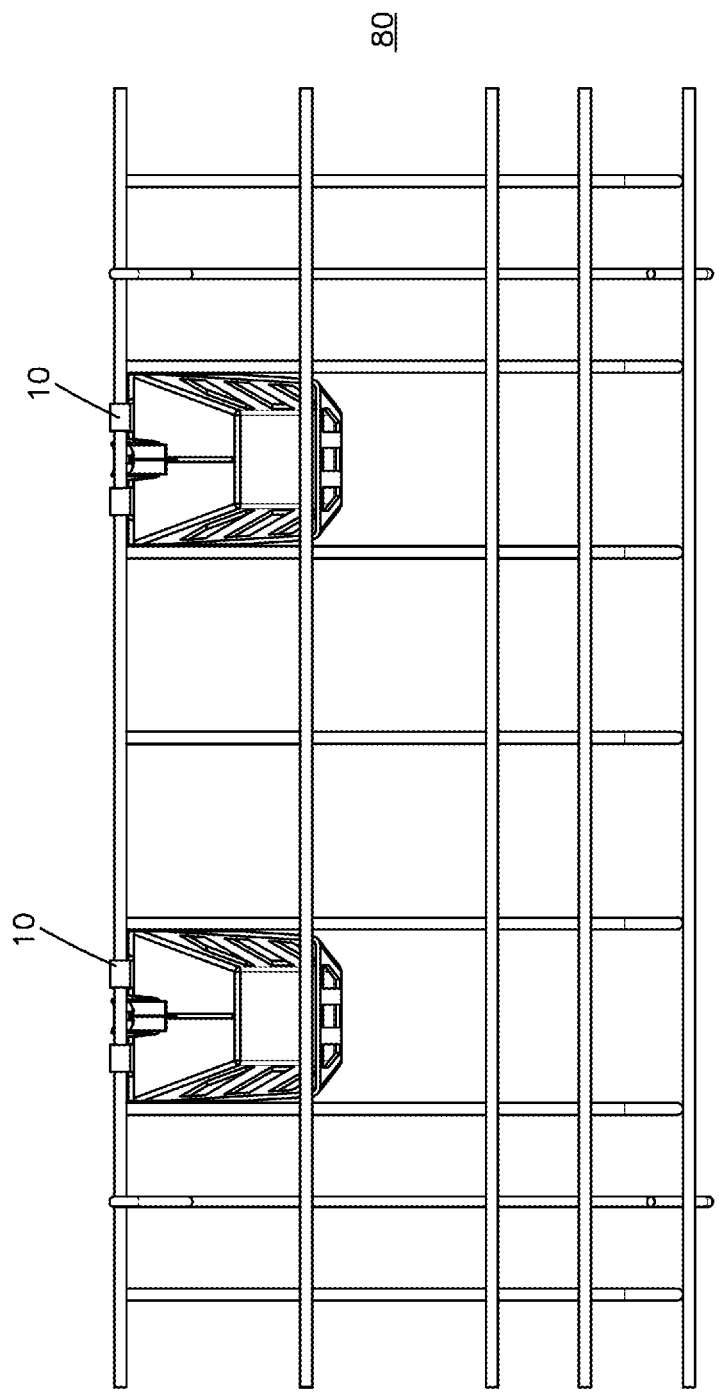
FIG. 13 is a front view of a of the structure of FIG. 11.
Figure 14:
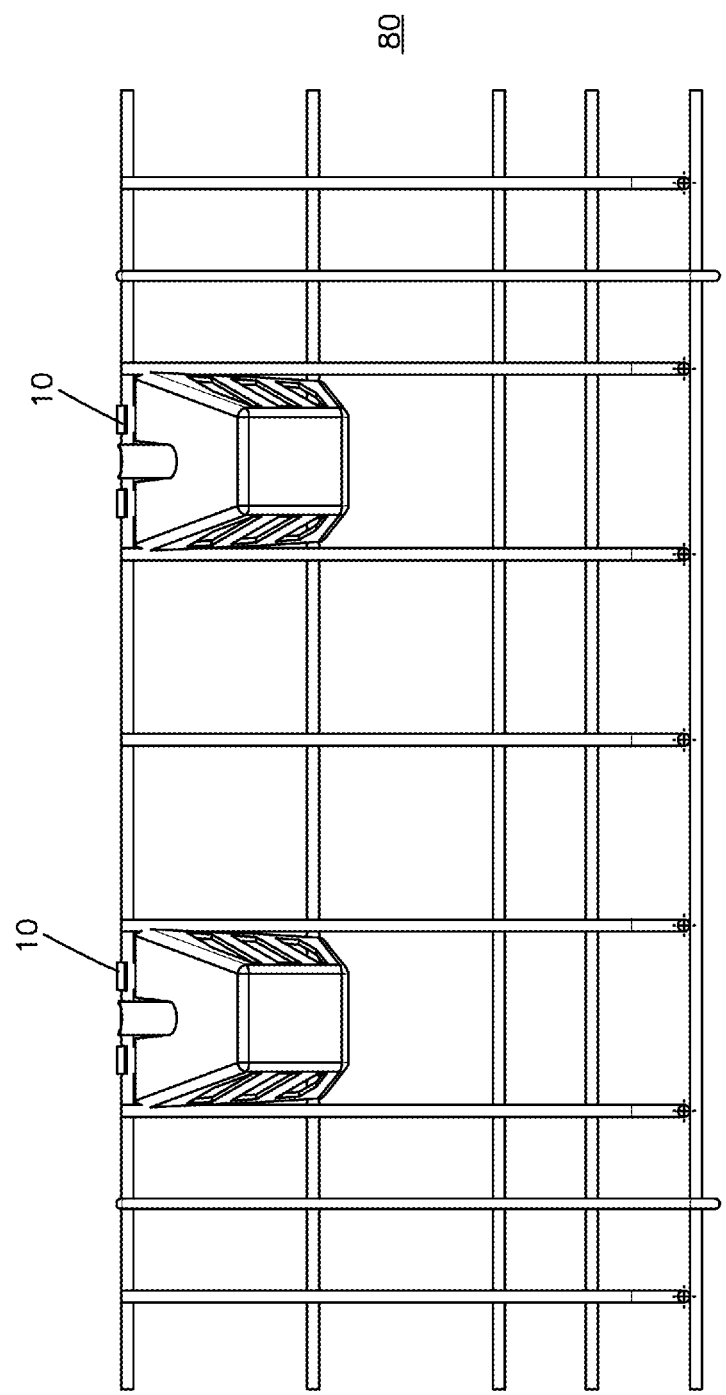
FIG. 14 is a rear view of the structure of FIG. 11.
Figure 15:
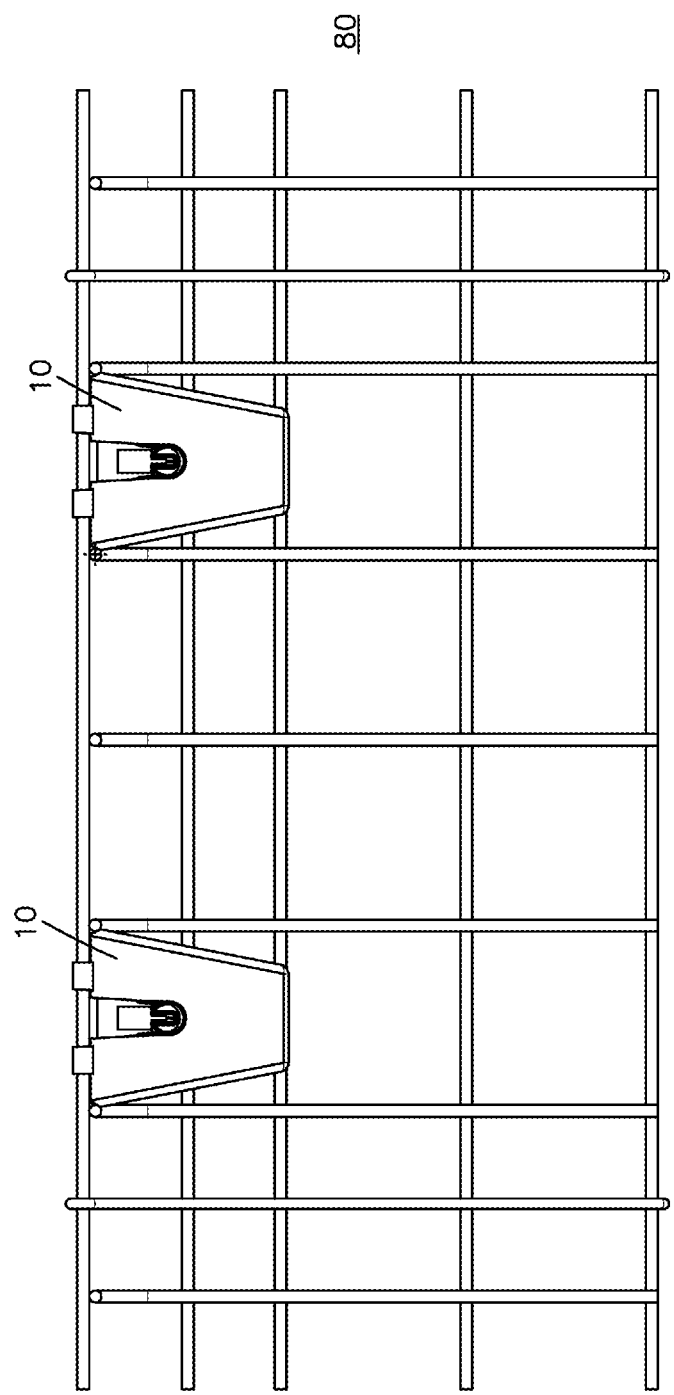
FIG. 15 is a top view of the structure of FIG. 11.
Figure 16:
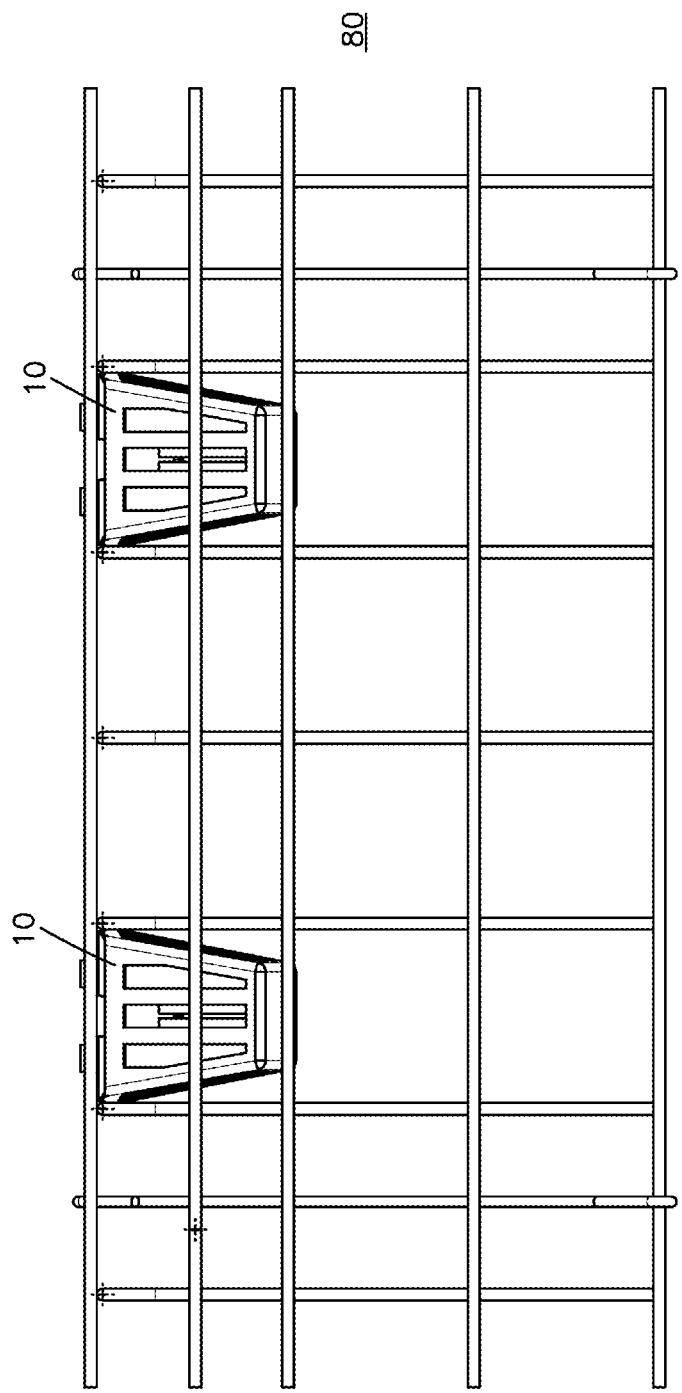
FIG. 16 is a bottom view of the structure of FIG. 11.

Walls 20, 22, 24, and 26 form a square or rectangular shape, in transverse cross section, which can be chosen according to the configuration of a container 90 that is intended to be used with pocket 10. Alternatively, the sidewall may be curved, such that the transverse cross section of the pocket structure is a circle, oval, or the like, such that the pocket has a cylindrical or frusto-conical shape, which shape may be useful when using cylindrical or conical plant containers, or plants without containers. A rear wall 28 is joined to the lower ends of walls 20, 22, 24, and 26. Pocket structure 10 is oriented such that the rear wall 28 is opposite a face 82 of wire mesh basket 80, as illustrated in FIG. 11. As illustrated in the figures, bottom wall 22 and sidewalls 24 and 26 include openings 34, which are slots in the embodiment of the figures, through which roots from the plants may grow through. In this regard the walls can be referred to as open.

Figure 23:
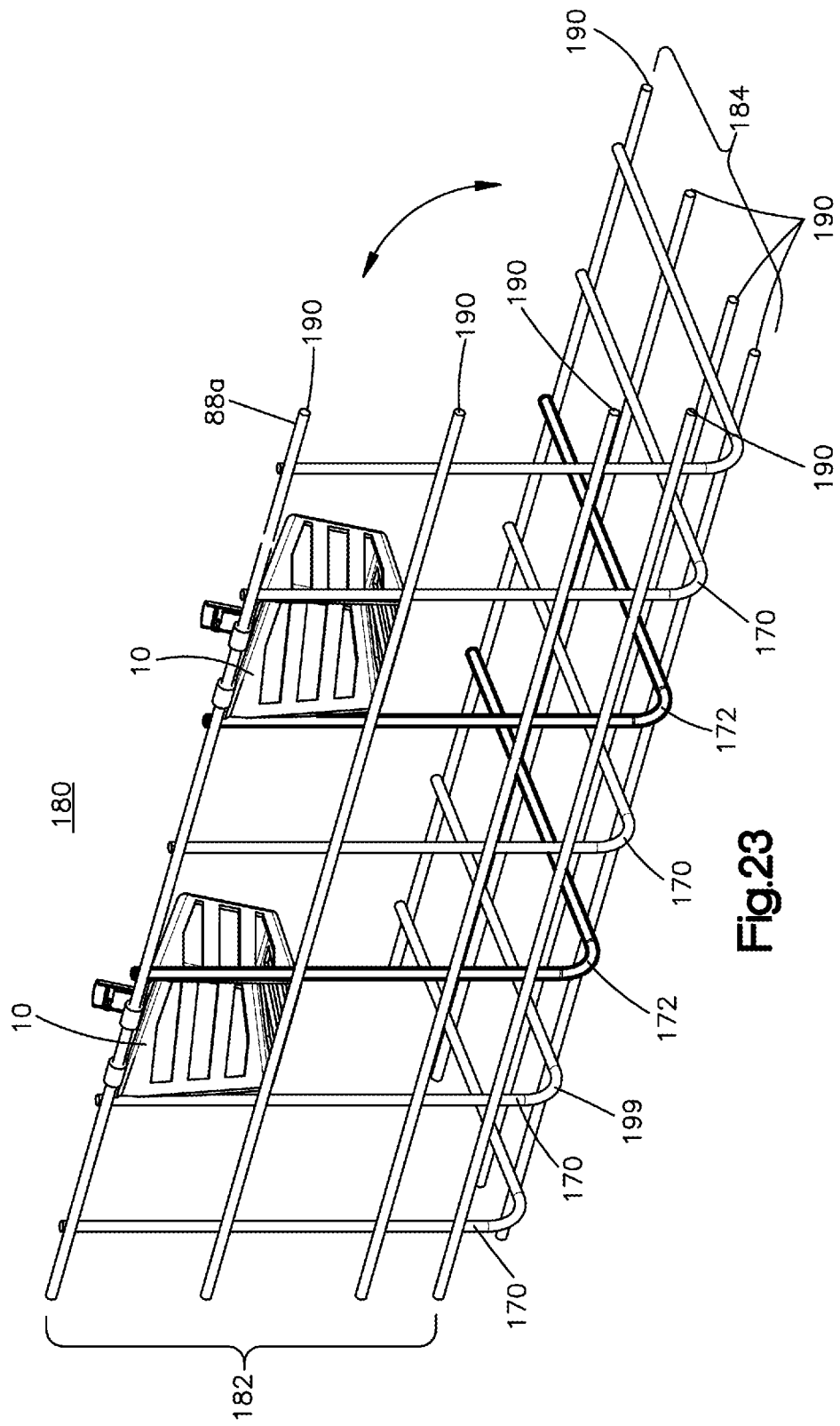
FIG. 23 is a perspective view of an alternative basket embodiment.

FIG. 23 illustrates an alternative embodiment basket 180 including longitudinal structural wires 190 on legs 184 and face 182 and L-shaped wires that are perpendicular to wires 190. L-shaped wires includes wires 170 and 172. Wires 170 and 172 may be as described for first embodiment basket 80. Wires 172 are thicker than wires 170 to provide increased stiffness or strength against bending in the direction shown in FIG. 23. Thus, wires 172 provide increased resistance to deformation by soil forces after installation that would tend to deform the top of face 182 outwardly. FIG. 23 omits brackets to illustrate that in some embodiments, the brackets may (optionally) be omitted. Further, the present invention encompasses using structure other than wires, as will be understood by persons familiar with metal fabrication. The description herein of the function of the basket 80 and its assembly into a wall structure applies equally to basket 180, given the optional nature of the brackets.

A top or forward-facing portion of the walls 20, 22, 24, and 26 form a front face 30, which as described below, can contact the wire mesh basket 80. A pair of hooks 32 extend from upper wall 20. Hooks 32 are configured to open rearwardly such that pocket structure 10 is mounted from the backside of mesh basket 80. Preferably, the hooks and wire mesh are sized such that the hooks snap onto the wire mesh (such as having a curved or circular profile having a structure that makes up greater than 180 degrees, or other retaining structure). Thus, pocket structure 10 hangs (preferably securely) on a horizontal wire of basket 80 with portion of face 30 contacting a face of wire basket 80. The term "hook surface" is employed to encompass hook 32 and other mechanisms for attaching a pocket structure to a wire mesh, including but not limited to a clip, crimping, tie (such as a cable tie), and the like fasteners. In embodiments in which a wire mesh is not used, the pocket structure may omit a hook altogether.

A liquid receiver, such as a boss 40, is formed on the upper wall 20, for receiving a drip emitter fitting 70. Boss 40 can take the shape of the intended drip fitting, and in the embodiment of the figures is a curved, or partial-cylinder shape to match the disk-like shape of fitting 70. Fitting 70 preferably is a conventional drip irrigation head. Fitting 70 includes a fitting inlet 72, which includes a barb for piercing an irrigation tube 60 that extends along the face of the reinforce soil structure. Irrigation tube 60 and fitting 70 may be of the type use in commercial or residential lawn and vegetation irrigation systems, such as, such as supplied by Rain Bird or other commercial suppliers. Upper wall 20 includes a drip channel feed 44, which can be a curved surface of the boss 40, and in the figures is illustrated by a channel in the boss 40 that runs to the underside of upper wall 20.

A drip channel 50 is a groove in the underside of upper wall 20 that runs longitudinally (that is, front to back) and is connected to channel feed groove 44 such that water from irrigation tube 60 moves through fitting 70, into channel feeder 44, and via surface tension down the sloped underside of wall 20 in drip channel 50. Thus, irrigation water can supplied deep (that is, in a direction into the wall) to the plants in pocket structure 10. Tabs or a pocket 94 preferably are located on the underside of wall 20 and in-line with drip channel 50 to hold a fertilizer pellet or tablet 93 to fertilize root system of the vegetation within pocket structure 10, at least upon initial installation. Reference numbers 93 and 94 are illustrated together to reflect both the tablet 93 and the tabs 94 for holding the tablet, which structure may be located in a pocket on the underside of wall 20, as illustrated in dashed lines (as the tablet will eventually dissolve) in FIG. 10.

In its installed position, such as shown in FIG. 1, upper wall 20 is sloped downwardly (relative to horizontal) and rearwardly, which slope enables gravity to move water via drip channel 50. The slope of upper wall 20, the shape and size of drip channel 50, and the design flow rate of irrigation water can be chosen together as design parameters, as will be understood by persons familiar with conventional irrigation technology in view of the present disclosure. The slope of upper wall 20 may also be chosen together with the slope of lower wall 22 and the shape and dimension of container 90, as it is preferred that lower wall 22 slope downwardly and rearwardly such that the container 90 rests within pocket structure 10 by gravity. Container 90 is partially shown in FIG. 1, and preferably is spaced apart from upper wall 22 by a gap 92 to promote drip irrigation flow, as explained below. Any type of engineering plastic may be used for forming pocket structure 10 that is suitable for ground contact and (optionally) exposure to sunlight.

Any type of plant, such as an annual, perennial, grass, vine, or other vegetation, may be used. The plants preferably are in a container 90, such as peat pot in a conventional size—for non-limiting example, 2.25 inches square and 2.25 inches deep, 3 inches square and 3 inches deep, 3.5 inches square and 3.75 inches deep, 4.25 inches square and 3.5 inches deep, 5.5 inches tall and 3.5 inches deep. The dimensions of pocket structure 10 are then chosen accordingly to achieve the structure and function described herein.

FIGS. 11 through 16 illustrate an embodiment of wire mesh unit 80, which includes a front face 82, a rearwardly extending lower leg portion 84, and braces 86. Preferably, lower leg portion 84 is perpendicular to front face 82. The individual wires are indicated by reference number 88. The uppermost horizontal wire, which is shown having two pocket structures 10 installed, is indicated by reference number 88a. The rearward-most wire is indicated by reference number 88b. Preferably, the front face 82 is configured to be installed such that is forms an angle with a vertical reference line between zero degrees and 12 degrees (measured opening rearwardly—this is, a positive angle opens to inboard side, facing the earth wall). The term "vertical" is used herein without limitation to any particular magnitude of angle; rather, "vertical" is intended to be used consistently with the understanding in the commercial landscaping industry.

Brackets 86 extend between front face 82 and lower portion 84, and as shown in the figures between uppermost wire 88a and the distal-most wire 88b of lower portion 84. Brackets 86 having hooks on each end for engaging wires 88a and 88b, as the forces applied by the soil tend to push portions 82 and 84 (angularly) apart. Thus, brackets 86 are primarily in tension when installed. Wire mesh units 80 are formed by manufacturing the wire mesh by well-known means, preferably of hot dipped galvanized steel, and bending the mesh sheet to form face 82 and leg 84. The materials, wire diameter, welding type, coatings, and other engineering parameters may be chosen according to the particular needs of the wall installation, such as total wall height desired, unit height, row set back dimensions, soil conditions, toe slopes, aesthetics, and the like.

Pockets 10 are hung from wire 88a and retained on the rear or backside of face 82. Preferably, pockets 10 and the mesh size opening of mesh unit 80 are sized such that pocket 10 has at least one dimension (that is, height or width) that is larger than the corresponding mesh opening dimension to retain pocket structure 10 on the backside of face 82. Also, tabs outboard of the sidewalls or bottom wall, or like structures can be used to prevent pocket structure 10 from inadvertently poking through the mesh opening of face 82. It is preferred that pocket structure 10 be located on the backside of face 82, and other configurations are contemplated in which a portion of a pocket protrudes forward relative to face 82.

Figure 17:
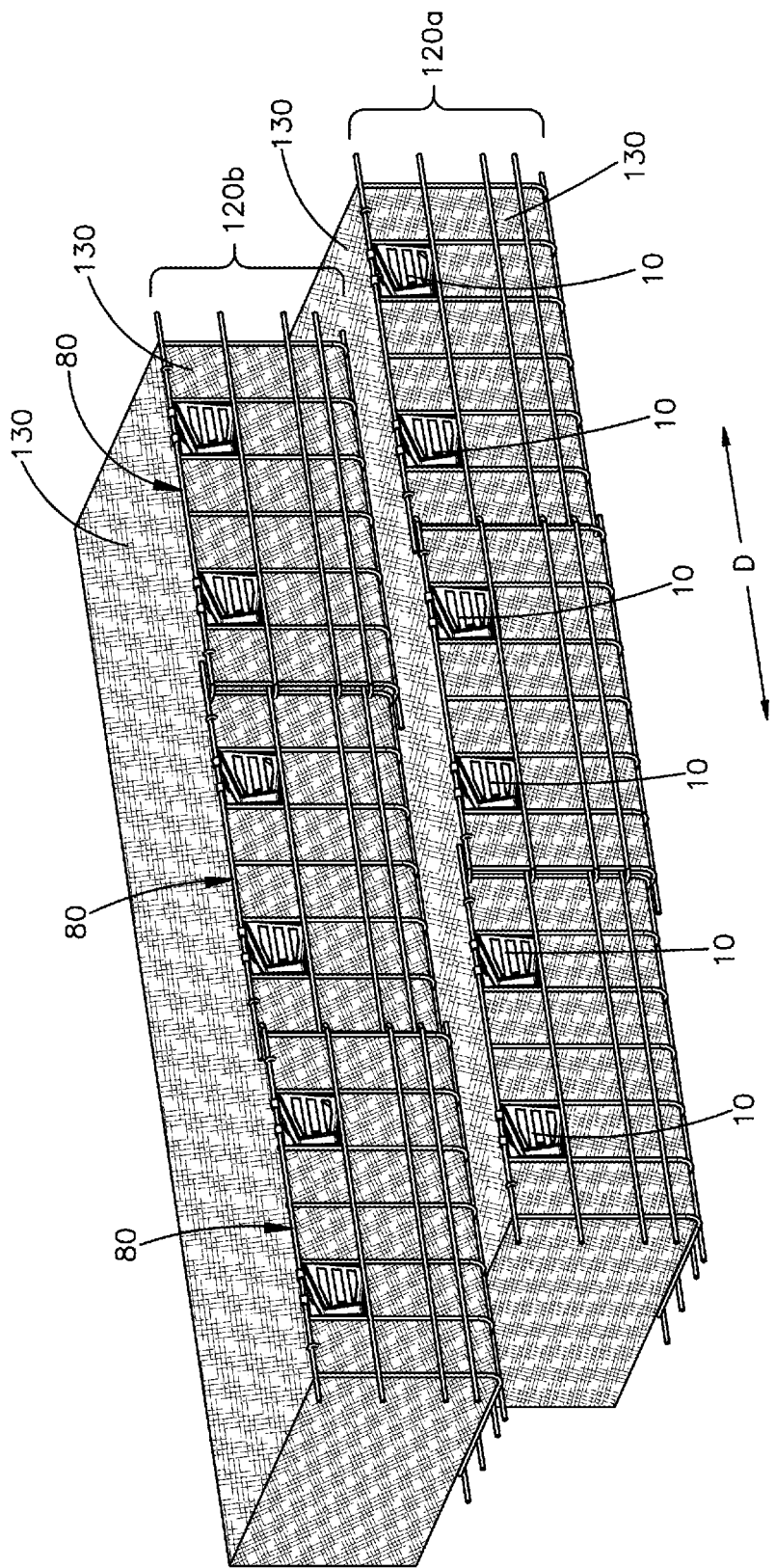
FIG. 17 is a perspective view of a vertical earth wall structure having two rows.
Figure 18:
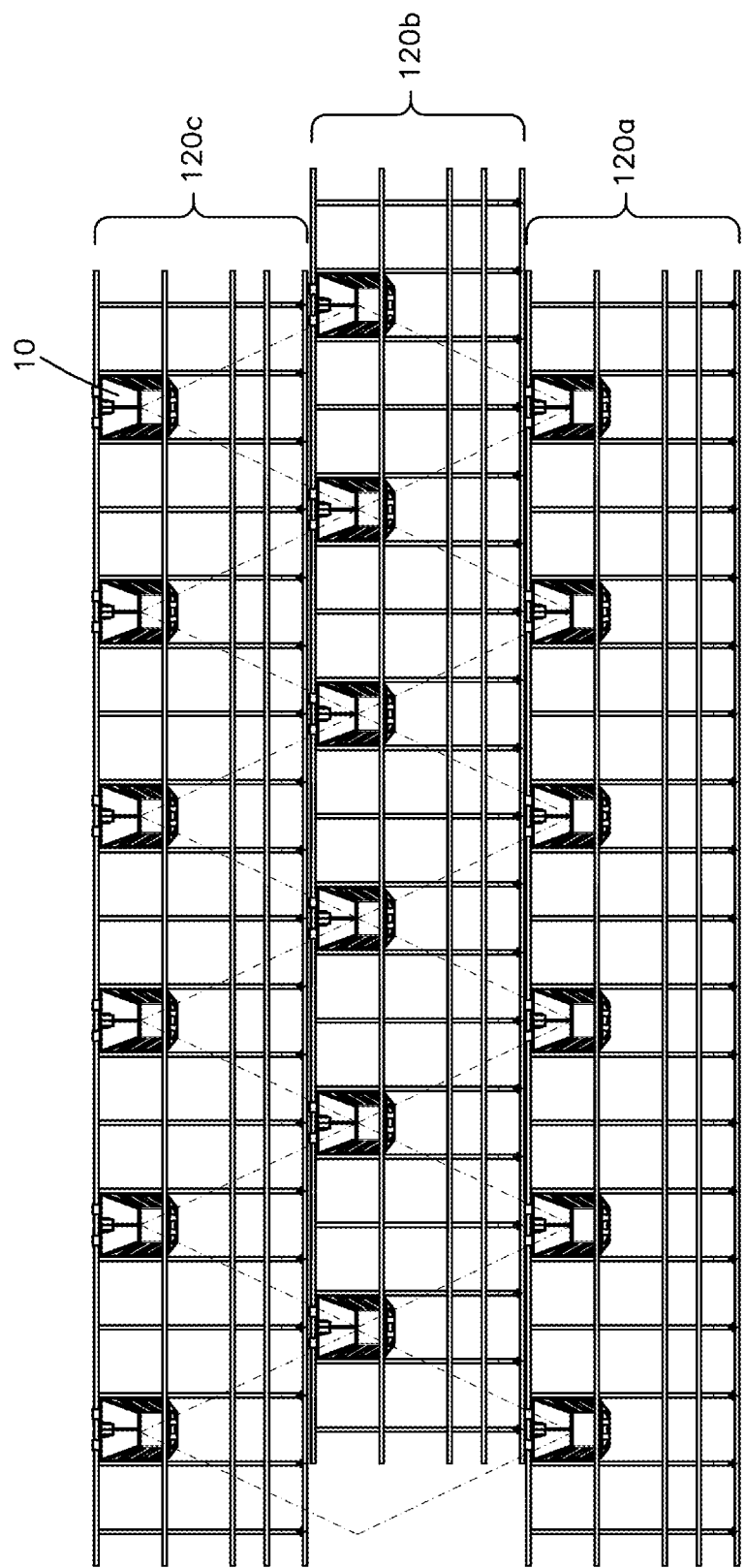
FIG. 18 is a perspective view of a vertical earth wall structure having three rows.
Figure 19:
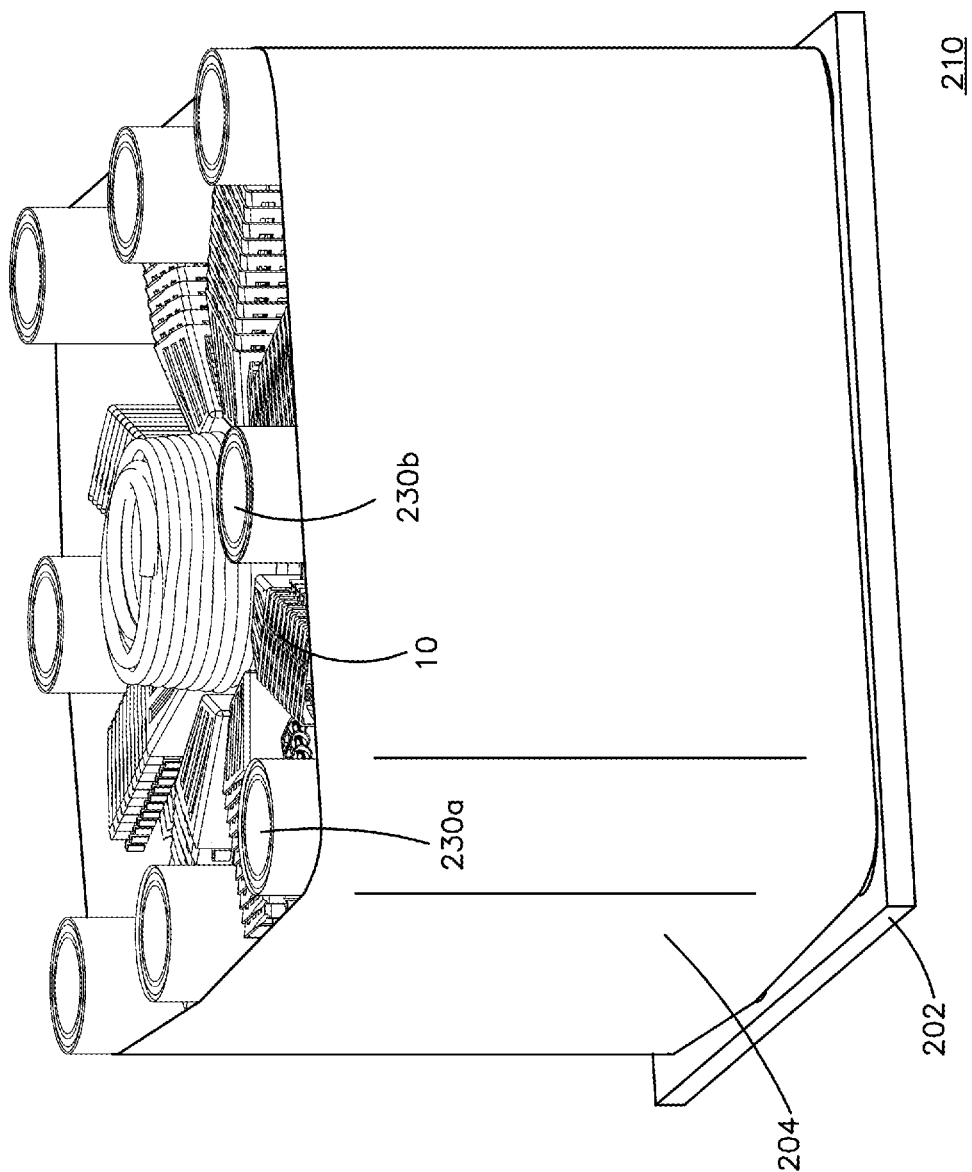
FIG. 19 is a view of a kit assembled on a pallet.
Figure 20:
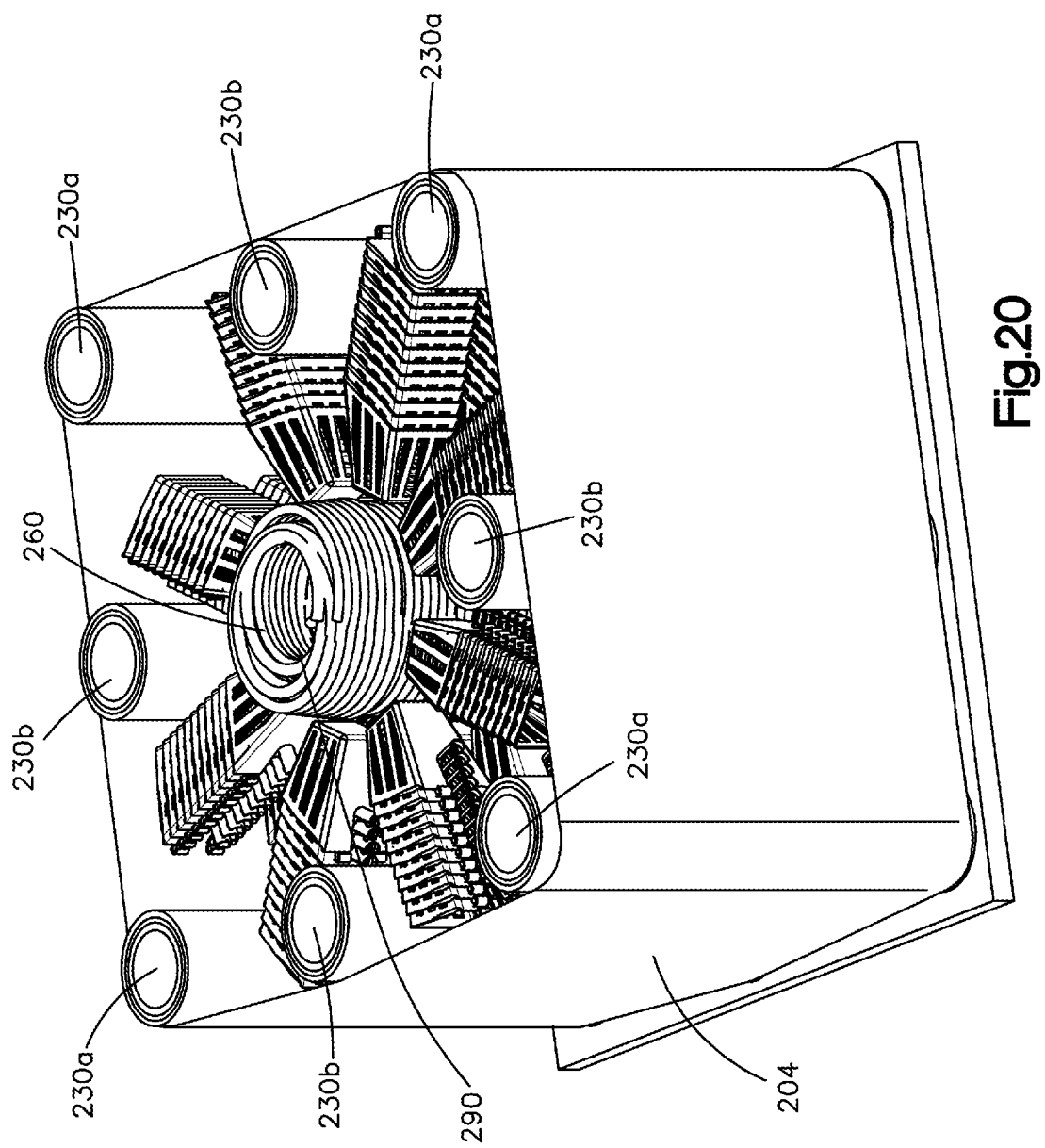
FIG. 20 is another view of the kit of FIG. 19.
Figure 21:
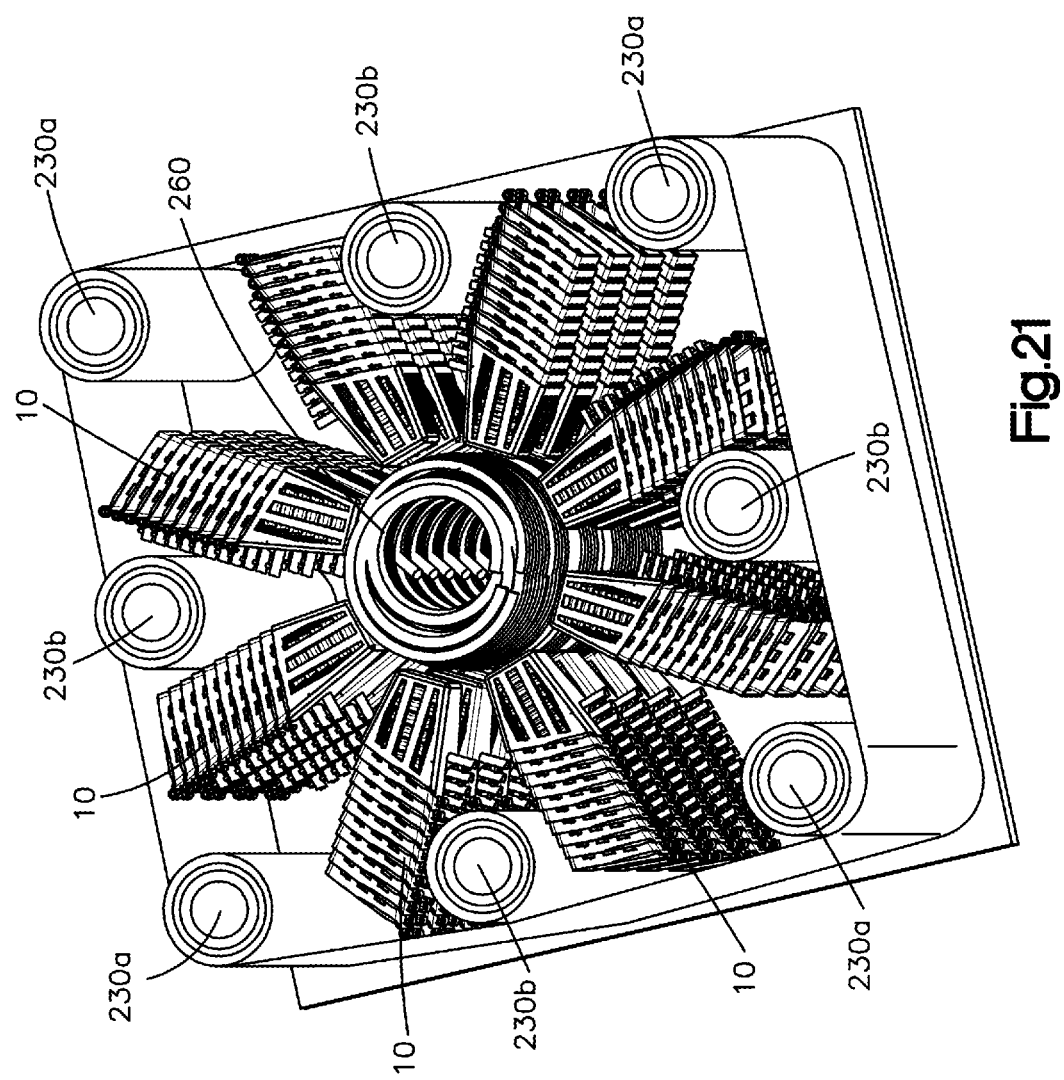
FIG. 21 is another view of the kit of FIG. 19.
Figure 22:
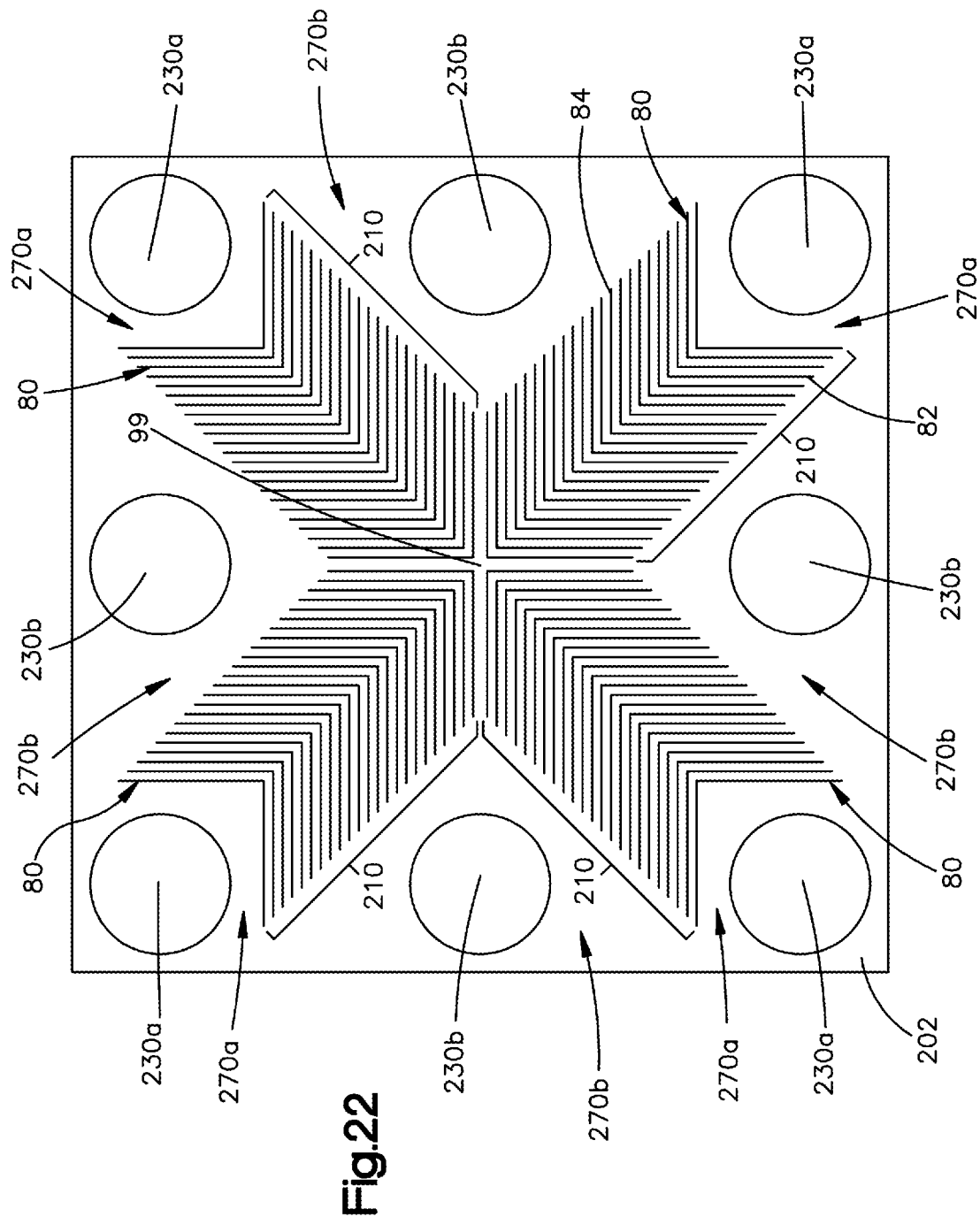
FIG. 22 is a schematic illustration of the orientation of some of the components of the kit on the pallets.

FIGS. 17 and 18 illustrate an earth wall 110 that includes two earth wall rows 120a and 120b. Each earth wall row 120 (the reference numbers without an appended letter are used to refer to structures generally) includes one or more layers of reinforcement fabric 130 arranged according the desired design of the site; multiple, aligned wire mesh units 80 across the front face of row 120; and multiple pocket structures 10, which are spaced at intervals chosen for the particular installation, according to know principles. Adjacent mesh units 80 can be attached together with wire clips or other means, such as opposing hooks formed the terminal ends of the wires 88 that can be engaged and mated when installing one unit 80 next to another. An irrigation tube 60 (not shown in FIGS. 17 and 18) runs along wire 88a.

Fabric 130 may include primary reinforcement fabric and/or secondary reinforcement fabric according to conventional parameters, preferably configured in a C-shaped (in vertical or transverse cross section). When both primary and secondary reinforcement fabric is used, the primary reinforcement fabric preferably extends into the earth at a distance greater than that of the secondary fabric. As illustrated, it is preferred that the fabric 130 be rearward or behind front face 82 of mesh unit 80.

In a particular embodiment, each wire mesh unit 80 is 24 inches long (that is, along dimension arrow D in FIG. 17) and 12 inches high and 12 inches deep (that is, surfaces 82 and 84 have a leg dimension of 12 inches) to promote stacking of the units 80 and packing on a pallet. In this embodiment, horizontal wires are spaced four inches apart both in face 82 and leg 84, and then two additional horizontal wires bisect the lower opening of face 82 and the front opening of leg 84. The configuration may also be considered to have two 4 inch spacings and two 2 inch spacings on the front face; and two 4 inch spacings and two 2 inch spacings on the front face. The two inches spacings are at about the bend to provide rigidity.

In this regard, at least some of the mesh units 80, such as the embodiment that is 24 inches long, can be oriented vertically such that the wire mesh units 80 can support the load of another pallet placed on top of the first pallet. Thus, each pallet or groups of pallets can pre-package the materials for forming an earth wall, including mesh units 80, pockets 10, and irrigation tubing 60. The pre-packaged wall system components are contrary to the industry wire mesh units, which typically are provided in longer lengths (often 10 feet long) and 18 inches by 18 inches (leg lengths).

As illustrated in FIG. 17, an upper row 120b is set back relative to a lower row 120a; faces 82 of mesh units 80 of upper row 120b are set back (that is, spaced apart to the rear) of faces 82 of mesh units 80 of lower row 120a. FIG. 18 illustrates three rows 120a, 120b, and 120c, with the locations of the pocket structures 10 in a diamond pattern.

The method of using pocket structures 10 and wire mesh units 80, and for forming an earth wall 110, as described above, includes laying wire mesh baskets 80 end to end on a prepared earth surface to desired final length (along dimension D) and fastening them together as needed. As explained above, faces 82 preferably are inclined between zero degrees and 12 degrees. Pocket structures 10 are installed at desired locations by engaging hooks 32 with wires 88a from the backside of wire mesh unit 80. In this regard, upon clipping hooks 32 on wire 88a, pocket 10 may drop into position such that front face 30 of the pocket 10 contacts the back side of wire mesh face 82.

Fittings 70 may be pre-assembled with pocket structure 10 or may be installed into boss 40 after pocket structures 10 are applied to wire mesh baskets 80. An irrigation tube 60 is run along the top of mesh units 80 and may be affixed to top wire 88a. Preferably, fittings 70 are joined to tube 60 by pressing the barb on the fitting connector 72 directly through the wall of tube 60. Other joining methods are contemplated.

Primary and/or secondary reinforcement fabric may be installed according to conventional practices at the appropriate time, and preferably is cut such that pocket structures extend through the fabric. As illustrated in the figures, the fabric preferably is installed on the backside of the wire mesh unit faces 82. Other locations of the fabric are contemplated. The term "reinforcement fabric" is used herein to refer to primary, secondary, and/or any type of fabric used in earth walls. Fill (such as soil) may be filled behind mesh units 80 and together with the fabric complete a row, such as row 120. In this regard, the weight of the fill anchors or secures wall 110, as the fill creates downward force on the lower legs of mesh units 80. At some point, vegetation in pots 90 is installed in each one of pocket structures 10 from the front side. As will be understood by persons familiar with earth wall technology, the above steps may be performed in any logical order. The above steps are repeated to form second row 120b, usually beginning with a desired set back distance, which is chosen according to known parameters, such as soil conditions, wall design, and the like.

Referring to FIGS. 19 through 22 to illustrate a kit 200 of the components described herein, kit 200 includes a pallet 202, four groups 210 units 80, four rolls of primary reinforcing fabric 230a, four rolls of secondary reinforcing fabric 230b, a roll of irrigation tubing 260, and pocket structures 10, as well as a wrap 204 about the components. Units 80 are vertically oriented (that is, 90 degrees from their installed position such that in top view (as in FIG. 22) the L-shape forms a V) with the vertices 99 (see FIG. 17, and FIG. 23 for vertex 199 of embodiment basket 180) adjacent such that are nearly in contact at a center of pallet 202.

The orientation of the groups 210 create right angle recesses 270a at the distal end of each group, yet still on pallet 202. Rolls of reinforcement fabric 230a are located in the right-angle recesses 270a. Groups 210 also form a V-shaped recess 270b between adjacent groups. Other rolls of reinforcement fabric 230b are located in the v-shaped recesses. Depending on the configuration of each basket and their nesting parameters, lengths of legs and faces, whether the legs and faces have the same dimension, and like parameters, the sizes of recesses 270a and 270b may vary, and thus the fabric rolls with the largest diameters may be located in the largest recesses.

As illustrated in the figures, the height of rolls 230a and 230b is greater than the height of the brackets 80. In the figures, rolls 230a and 230b are 36 inches high and the brackets groups 210 are 28 inches high. Thus, the space within the eight rolls defines a cargo bay 290 into which the roll of irrigation tubing is retained. Pockets 10 are located in bay 290 as well as in the spaces between adjacent rolls. Drip emitters and irrigation fittings (not shown in the figures) may be located anywhere in or around bay 290. Preferably 100 baskets, between 50 and 100 square yards of each primary and secondary reinforcement fabric (depending on the job requirements), 200 pocket structures and drip emitters, and 100 feet of irrigation tubing and corresponding fittings form kit 200 to provide a complete set of components for 200 square feet of earth wall system, as described herein.

Aspects of the present invention are disclosed herein using specific example of structure and function. The present invention is not limited to the particular structure and function disclosed in the text and drawings, as the structure and function of the embodiments are examples. Rather, the inventors intend that the scope of the invention be defined as set out in the claims. For non-limiting example, the pocket structure is described as receiving a container holding a plant, and specific configurations of the pocket structure, mesh unit, and a wall mesh units described. Nor is the invention limited to any particular dimension of the baskets or other components, unless set out in the claims. The invention is not limited by the size or shape of container, nor to even having a container at all, and the pocket structure, mesh unit, and wall are not limited to any configuration, unless stated in the claims.

The invention claimed is:

1. A palletized kit for a reinforced earth wall system comprising:
    nested groups of L-shaped earth wall baskets proximate a center of a pallet, the groups being oriented vertically such that (i) vertices of the groups are adjoining; (ii) an outboard one of each one of the nested groups forms a vertical, right angle recess; and (iii) outboard portions of adjacent nested groups form V-shaped recesses therebetween;
    vertically oriented first rolls of reinforcement fabric located in the right angle recesses on the pallet;
    vertically oriented second rolls of reinforcement fabric located in the V-shaped recesses on the pallet;
    at least one of the groups of baskets, the first rolls, and the second rolls packed on the pallet forming a base structure capable of supporting a vertical load from another palletized kit for a reinforced earth wall system;
    plural pocket structures adapted for mounting to the baskets and for receiving vegetation, the pocket structures being located in a central bay formed between at least some of the first rolls and the second rolls of reinforcement fabric; and
    irrigation tubing being located in the central bay;
    whereby the baskets, first and second rolls of reinforcement fabric, the pocket structures, and the irrigation tubing are adapted for installation together with earth fill after unpacking from the pallet to form a reinforced earth wall system.

2. The kit of claim 1 wherein the first rolls of reinforcement fabric are primary reinforcement fabric and the second rolls of reinforcement fabric are secondary reinforcement fabric.

3. The kit of claim 2 wherein the groups of baskets have a vertical dimension and the first and second rolls of reinforcement fabric are taller than the vertical dimension of the groups of baskets such that the first and second rolls of reinforcement fabric form the base structure capable of supporting the vertical load.

4. The kit of claim 2 wherein each basket has a face, a leg, and a vertex, the face having a length measured from the vertex that is approximately equal to a length of the leg of the basket measured from the vertex.

5. The kit of claim 4 wherein each one of the baskets includes the face and the leg forming approximately a right angle therebetween.

6. The kit of claim 2 wherein a diameter of the secondary fabric rolls is less than a diameter of the primary fabric rolls.

7. The kit of claim 1 wherein quantities of each one of the baskets, first and second rolls of reinforcement fabric, the pocket structures, and the irrigation tubing mutually correspond to a desired reinforced earth wall system quantity.

8. The kit of claim 7 wherein the pallet includes quantities of each one of the baskets, first and second rolls of reinforcement fabric, the pocket structures, and the irrigation tubing to form 200 square feet of a reinforced earth wall.

9. The kit of claim 8 wherein the kit on the pallet is a four foot cube.

10. The kit of claim 8 wherein the irrigation tubing is formed in a roll and includes drip emitters and irrigation fittings.

11. The kit of claim 8 wherein each basket is approximately 28 inches long, including 24 inch wire mesh and two inches of protruding wires on each end;
    pocket sidewalls that are adapted for receiving a containerized vegetation;
    a hook surface adapted for attaching the pocket sidewalls to a reinforced soil structure wire; and
    a liquid receiver adapted for receiving liquid from an irrigation system; and
    irrigation tubing located on the pallet;
    whereby the baskets, pocket structures, and irrigation tubing are adapted for forming into a reinforced earth wall system.

12. A cube-shaped palletized kit for a reinforced earth wall system comprising:
    L-shaped earth wall baskets on a pallet;
    plural pocket structures adapted for installing in an earth wall, each pocket structure comprising pocket sidewalls that are adapted for receiving a containerized vegetation;
    rolls of reinforcement fabric on the pallet;
    at least one of (i) a group of the earth wall baskets and (ii) the rolls of reinforcement fabric being oriented on the pallet to form a base structure capable of supporting a vertical load from another palletized kit for a reinforced earth wall system;
    whereby the palletized kit forms a cube shape, and whereby the baskets, the pocket structures, and the reinforcement fabric are adapted for forming into a reinforced earth wall system upon removal from the pallet.

13. An earth wall system suitable for growing vegetation at a front face thereof, comprising:
    a mesh basket including longitudinal structural components and L-shaped structural components, the L-shaped structural components including first L-shaped components and second L-shaped components that are stronger than the first L-shaped components, each one of the first L-shaped components and the second L-shaped components having an L-shape, whereby at least the second L-shaped components are adapted to resist outward angular deformation of the front face of the mesh basket;
    a reinforcement fabric having a portion that is vertical and proximate the front face of the basket;
    a pocket structure that is located in an opening of the basket and is attached to the mesh basket by a hook;
    vegetation that is located in the pocket structure; and
    an irrigation head located above the pocket structure that is connected to irrigation tubing.

14. The earth wall system of claim 13 wherein the L-shaped structural components of the mesh basket are wires, and the second L-shaped components of the mesh basket are wires having a diameter greater than a diameter of the wires of the first L-shaped components.

15. The earth wall system of claim 14 wherein the mesh basket omits brackets between a leg and a face of the mesh basket, whereby the second L-shaped components enhance strength of the mesh baskets to resist the angular deformation upon installation.

16. The earth wall system of claim 15 wherein the mesh basket consists essentially of the longitudinal structural components and the L-shaped structural components, and the first L-shaped components are evenly spaced apart.

17. The earth wall system of claim 13 wherein the pocket structures are configured to engage the wire basket such that the vegetation grows from a back side of the wire mesh through the wire mesh to the front face of the mesh basket.

18. The palletized kit for a reinforced earth wall system of claim 12 wherein the at least one of the group of the earth wall baskets and the rolls of reinforcement fabric is vertically oriented on the pallet to bear the vertical load from the other palletized kit for a reinforced earth wall system.

19. The palletized kit for a reinforced earth wall system of claim 12 wherein each one of the group of the earth wall baskets and the group of the rolls of reinforcement fabric is vertically oriented on the pallet to bear the vertical load from the other palletized kit for a reinforced earth wall system.

20. The palletized kit for a reinforced earth wall system of claim 18 wherein the palletized kit forms a cargo bay therein.

21. The palletized kit for a reinforced earth wall system of claim 20 wherein the palletized kit further includes irrigation tubing located in the cargo bay.

22. The palletized kit for a reinforced earth wall system of claim 21 wherein each one of the pocket structures further includes a hook surface adapted for attaching the pocket sidewalls to a reinforced soil structure wire and a liquid receiver adapted for receiving liquid from an irrigation system.

23. The palletized kit for a reinforced earth wall system of claim 21 wherein the palletized kit includes quantities of each one of the baskets, rolls of reinforcement fabric, the pocket structures, and the irrigation tubing to form 200 square feet of a reinforced earth wall.

24. The palletized kit for a reinforced earth wall system of claim 21 wherein the palletized kit on the pallet is approximately a four foot cube.

* * * * *